United States Patent
Chiba et al.

(10) Patent No.: US 10,721,244 B2
(45) Date of Patent: Jul. 21, 2020

(54) TRAFFIC FEATURE INFORMATION EXTRACTION METHOD, TRAFFIC FEATURE INFORMATION EXTRACTION DEVICE, AND TRAFFIC FEATURE INFORMATION EXTRACTION PROGRAM

(71) Applicant: NIPPON TELEGRAPH AND TELEPHONE CORPORATION, Chiyoda-ku (JP)

(72) Inventors: Daiki Chiba, Musashino (JP); Takeshi Yagi, Musashino (JP); Tohru Sato, Musashino (JP); Kazunori Kamiya, Musashino (JP); Kensuke Nakata, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 459 days.

(21) Appl. No.: 15/120,933

(22) PCT Filed: Mar. 12, 2015

(86) PCT No.: PCT/JP2015/057370
§ 371 (c)(1),
(2) Date: Aug. 23, 2016

(87) PCT Pub. No.: WO2015/141560
PCT Pub. Date: Sep. 24, 2015

(65) Prior Publication Data
US 2016/0366159 A1 Dec. 15, 2016

(30) Foreign Application Priority Data
Mar. 19, 2014 (JP) .................................. 2014-056659

(51) Int. Cl.
*H04L 29/06* (2006.01)
*G06F 21/55* (2013.01)

(52) U.S. Cl.
CPC .......... *H04L 63/1416* (2013.01); *G06F 21/55* (2013.01); *H04L 63/145* (2013.01);
(Continued)

(58) Field of Classification Search
None
See application file for complete search history.

(56) References Cited

U.S. PATENT DOCUMENTS

| 8,516,586 B1 * | 8/2013 | Jensen | H04L 63/1425 713/153 |
| 2006/0212942 A1 * | 9/2006 | Barford | H04L 63/1416 726/24 |

(Continued)

FOREIGN PATENT DOCUMENTS

| JP | 2004-312064 A | 11/2004 |
| JP | 2010-050939 A | 3/2010 |

(Continued)

OTHER PUBLICATIONS

Stanford.edu, "Chapter 7: Clustering", Dec. 16, 2010, http://infolab.stanford.edu/~ullman/mmds/ch7.pdf, p. 240-280, accessed Nov. 19, 2019 via Wayback Machine, https://web.archive.org/web/20101015000000*/%20http://infolab.stanford.edu/ullman/mmds/ch7.pdf (Year: 2010).*

(Continued)

*Primary Examiner* — Jeffery L Williams
(74) *Attorney, Agent, or Firm* — Oblon, McClelland, Maier & Neustadt, L.L.P.

(57) ABSTRACT

A traffic feature information extraction method including a regular expression process, a clustering process, and a feature information extraction process. The regular expres- (Continued)

sion process extracts an item set in advance from a traffic log and represents a partial character string included in the item in a regular expression based on a predetermined rule. The clustering process clusters an entry of the traffic log represented in the regular expression. The feature information extraction process extracts, as traffic feature information of each of clusters, an entry having a minimum total sum of distances among entries included in the clustered traffic logs.

6 Claims, 21 Drawing Sheets

(52) U.S. Cl.
CPC ...... *H04L 63/1458* (2013.01); *H04L 63/1425* (2013.01); *H04L 63/1491* (2013.01)

(56) References Cited

U.S. PATENT DOCUMENTS

| | | | |
|---|---|---|---|
| 2010/0050260 A1 | 2/2010 | Nakakoji et al. | |
| 2010/0199345 A1* | 8/2010 | Nadir | H04L 63/02 726/11 |
| 2010/0235918 A1* | 9/2010 | Mizrahi | H04L 63/1416 726/25 |
| 2011/0145238 A1* | 6/2011 | Stork | G06K 9/6219 707/737 |
| 2011/0167495 A1* | 7/2011 | Antonakakis | G06F 21/577 726/24 |
| 2013/0013542 A1* | 1/2013 | Sen | G06N 99/005 706/12 |
| 2013/0104230 A1* | 4/2013 | Tang | G06F 21/552 726/23 |
| 2015/0026808 A1* | 1/2015 | Perdisci | G06F 21/56 726/23 |
| 2016/0366159 A1* | 12/2016 | Chiba | G06F 21/55 |
| 2018/0034779 A1* | 2/2018 | Ahuja | G06F 16/90344 |
| 2018/0373888 A1* | 12/2018 | Zheng | G06F 21/6245 |

FOREIGN PATENT DOCUMENTS

| | | |
|---|---|---|
| JP | 2012-222692 A | 11/2012 |
| JP | 2013-085124 A | 5/2013 |

OTHER PUBLICATIONS

V. Ganti, R. Ramakrishnan, J. Gehrke, A. Powell and J. French, "Clustering large datasets in arbitrary metric spaces," Proceedings 15th International Conference on Data Engineering (Cat. No. 99CB36337), Sydney, NSW, Australia, 1999, pp. 502-511. (Year: 1999).*
Berkhin P. (2006) A Survey of Clustering Data Mining Techniques. In: Kogan J., Nicholas C., Teboulle M. (eds) Grouping Multidimensional Data. Springer, Berlin, Heidelberg (Year: 2006).*
International Search Report dated Jun. 9, 2015 in PCT/JP2015/057370 filed Mar. 12, 2015.
Narahashi et al., "Detecting Hostile Accesses through Incremental Subspace Clustering for Web Access Log", the $17^{th}$ Annual Conference of the Japanese Society for Artificial Intelligence, 2003 Ronbunshu, (26 pages with English translation).
Perdisci et al., "Behavioral Clustering of HTTP-Based Malware and Signature Generation Using Malicious Network Traces", NSDI, Apr. 2010 (14 pages).
Xie et al., "Spamming Botnets: Signatures and Characteristics", Proceedings of the ACM SIGCOMM 2008 conference on Data communication—SUGCOMM '08, vol. 38, No. 4, Aug. 2008 (12 pages).

* cited by examiner

FIG.2

| SERIAL NUMBER | MALWARE IDENTIFIER | COMMUNI-CATION SOURCE IP ADDRESS | COMMUNI-CATION DESTINA-TION IP ADDRESS | SENDER PORT | DESTINA-TION PORT | URL |
|---|---|---|---|---|---|---|
| 1 | M1 | 10.0.0.1 | 198.51.100.98 | 51234 | 80 | http://www.example.com/abcdef/index.php?test=123 |
| 2 | M1 | 10.0.0.2 | 198.51.100.98 | 50032 | 60320 | - |
| 3 | M2 | 10.0.0.2 | 192.0.2.100 | 12345 | 80 | http://www.example.com/test/image.php |
| ⋮ | ⋮ | ⋮ | ⋮ | ⋮ | ⋮ | ⋮ |
| 231 | M100 | 10.23.242.1 | 192.0.2.99 | 24323 | 23 | - |
| 232 | M100 | 10.22.2.145 | 203.0.113.10 | 12345 | 53 | - |
| 233 | M101 | 10.55.65.3 | 203.0.113.10 | 34567 | 80 | http://www.example.net/index.php?num=2 |
| ⋮ | ⋮ | ⋮ | ⋮ | ⋮ | ⋮ | ⋮ |

FIG.3

| SERIAL NUMBER | COMMUNI- CATION SOURCE IP ADDRESS | COMMUNI- CATION DESTINA- TION IP ADDRESS | SENDER PORT | DESTINA- TION PORT | URL |
|---|---|---|---|---|---|
| 1 | 10.0.0.1 | 198.51.100.98 | 51234 | 80 | http://www.example.com/ghijkl/index.php?test=456 |
| 2 | 10.0.0.2 | 192.0.2.100 | 50032 | 60320 | - |
| 3 | 10.0.0.2 | 192.0.2.100 | 12345 | 80 | http://www.example.com/test/hoge.php |
| ⋮ | ⋮ | ⋮ | ⋮ | ⋮ | ⋮ |
| 231 | 10.23.242.1 | 192.0.2.99 | 24323 | 23 | - |
| 232 | 10.22.2.145 | 203.0.113.10 | 12345 | 53 | - |
| 233 | 10.55.65.3 | 203.0.113.10 | 34567 | 80 | http://www.example.net/index.php?foo=8 |
| ⋮ | ⋮ | ⋮ | ⋮ | ⋮ | ⋮ |

FIG.4

| SERIAL NUMBER | CHARACTER CLASSIFICATION | REGULAR EXPRESSION PATTERN |
|---|---|---|
| 1 | ALPHABETICAL CHARACTER | [a-zA-Z] |
| 2 | INTEGER | [0-9] |
| 3 | HEXADECIMAL NUMBER | [0-9a-fA-F] |
| 4 | Base64 | [0-9a-zA-Z+/=] |
| ... | ... | ... |

FIG.5

| SERIAL NUMBER | WORD |
|---|---|
| 1 | index |
| 2 | php |
| 3 | test |
| ... | ... |

| SERIAL NUMBER | IP ADDRESS | ADDRESS PREFIX | AS NUMBER | ORGANIZA-TION NAME | ... |
|---|---|---|---|---|---|
| 1 | 192.0.2.100 | 192.0.2.0/24 | 64500 | TEST-NET-1 | ... |
| 2 | 198.51.100.98 | 198.51.100.0/24 | 64501 | TEST-NET-2 | ... |
| 3 | 203.0.113.10 | 203.0.113.0/24 | 64502 | TEST-NET-3 | ... |
| ... | ... | ... | ... | ... | ... |

FIG.9

| SERIAL NUMBER | COMMUNI-CATION SOURCE IP ADDRESS | COMMUNI-CATION DESTINA-TION IP ADDRESS | URL | FQDN | URL PATH PORTION | URL QUERY PORTION | UserAgent | ⋮ |
|---|---|---|---|---|---|---|---|---|
| 1 | 10.0.0.1 | 198.51.100.98 | http://www.example.com/ [a-zA-Z]{6}/index.php?test=[0-9]{3} | www.example.com | /[a-zA-Z]{6}/ index.php | test=[0-9]{3} | [0-9a-fA-F] {10} | ⋮ |
| 2 | 10.0.0.2 | 192.0.2.100 | http://www.example.com/ test/[a-zA-Z]{5}.php | www.example.com | /test/ [a-zA-Z]{5}.php | - | [0-9a-zA-Z+/=] {8} | ⋮ |
| 3 | 10.0.0.2 | 203.0.113.10 | http://www.example.net/ index.php?[a-zA-Z]{3}=[0-9]{1} | www.example.net | index.php | [a-zA-Z]{3} =[0-9]{1} | [a-zA-Z]{6} | ⋮ |
| ⋮ | ⋮ | ⋮ | ⋮ | ⋮ | ⋮ | ⋮ | ⋮ | ⋮ |

FIG.10

| SERIAL NUMBER | COMMUNI-CATION SOURCE IP ADDRESS | COMMUNI-CATION DESTINA-TION IP ADDRESS | URL | FQDN | URL PATH PORTION | URL QUERY PORTION | UserAgent | ⋮ |
|---|---|---|---|---|---|---|---|---|
| 1 | 10.0.0.1 | 198.51.100.98 | http://www.example.com/[a-zA-Z]{6}/index.php?test=[0-9]{3} | www.example.com | /[a-zA-Z]{6}/index.php | test=[0-9]{3} | [0-9a-fA-F]{10} | ⋮ |
| 2 | 10.0.0.2 | 192.0.2.100 | http://www.example.com/test/[a-zA-Z]{4}.php | www.example.com | /test/[a-zA-Z]{4}.php | - | [0-9a-zA-Z+/=]{8} | ⋮ |
| 3 | 10.55.65.3 | 203.0.113.10 | http://www.example.net/index.php?[a-zA-Z]{3}=[0-9]{1} | www.example.net | index.php | [a-zA-Z]{3}=[0-9]{1} | [a-zA-Z]{6} | ⋮ |
| ⋮ | ⋮ | ⋮ | ⋮ | ⋮ | ⋮ | ⋮ | ⋮ | ⋮ |

FIG.12

| SERIAL NUMBER | COMMUNI-CATION SOURCE IP ADDRESS | COMMUNI-CATION DESTINA-TION IP ADDRESS | URL | FQDN | URL PATH PORTION | URL QUERY PORTION | UserAgent | ... |
|---|---|---|---|---|---|---|---|---|
| 1 | 10.0.0.1 | 198.51.100.98 | http://www.example.com/[a-zA-Z]{6}/index.php?test=[0-9]{3} | www.example.com | /[a-zA-Z]{6}/index.php | test=[0-9]{3} | [0-9a-fA-F]{10} | ... |
| 2 | 10.0.0.2 | 198.51.100.98 | http://www.example.com/[a-zA-Z]{6}/[a-zA-Z]{5}.php?[a-zA-Z]{2}=[0-9]{3} | www.example.com | /[a-zA-Z]{6}/[a-zA-Z]{5}.php | [a-zA-Z]{2}=[0-9]{3} | [0-9a-zA-Z+/=]{8} | ... |
| 3 | 10.0.1.1 | 192.0.2.1 | http://www.example.net/[0-9]{4}-[0-9]{2}-[0-9]{2}/image.php?num=[0-9]{1} | www.example.net | /[0-9]{4}-[0-9]{2}-[0-9]{2}/image.php | num=[0-9]{1} | [a-zA-Z]{6} | ... |
| 4 | 10.0.0.3 | 198.51.100.98 | http://www.example.com/[a-zA-Z]{5}/[a-zA-Z]{4}.php?[0-9]{2}=[a-zA-Z]{3} | www.example.com | /[a-zA-Z]{5}/[a-zA-Z]{4}.php | [0-9]{2}=[a-zA-Z]{3} | [0-9a-zA-Z+/=]{8} | ... |
| ... | ... | ... | ... | ... | ... | ... | ... | ... |

FIG.13

| SERIAL NUMBER | COMMUNI-CATION SOURCE IP ADDRESS | COMMUNI-CATION DESTINA-TION IP ADDRESS | URL | FQDN | URL PATH PORTION | URL QUERY PORTION | UserAgent | ... |
|---|---|---|---|---|---|---|---|---|
| 1 | 10.0.0.1 | 198.51.100.98 | http://www.example.com/[a-zA-Z]{6}/index.php?test=[0-9]{3} | www.example.com | /[a-zA-Z]{6}/index.php | test=[0-9]{3} | [0-9a-fA-F]{10} | ... |
| 2 | 10.0.0.2 | 198.51.100.98 | http://www.example.com/[a-zA-Z]{6}/index.php?test=[0-9]{3} | www.example.com | /[a-zA-Z]{6}/index.php | test=[0-9]{3} | [0-9a-fA-F]{10} | ... |
| 3 | 10.0.0.3 | 198.51.100.98 | http://www.example.com/[a-zA-Z]{5}/[a-zA-Z]{4}.php?[0-9]{2}=[a-zA-Z]{3} | www.example.com | /[a-zA-Z]{5}/[a-zA-Z]{4}.php | [0-9]{2}=[a-zA-Z]{3} | [0-9a-zA-Z+/=]{8} | ... |
| 4 | 10.0.0.3 | 198.51.100.98 | http://www.example.com/[a-zA-Z]{4}.php?abc=[0-9]{3} | www.example.com | /[a-zA-Z]{4}.php | abc=[0-9]{3} | [0-9]{6} | ... |
| 5 | 10.0.0.2 | 198.51.100.98 | http://www.example.com/[a-zA-Z]{6}/index.php?test=[0-9]{3} | www.example.com | /[a-zA-Z]{6}/index.php | test=[0-9]{3} | [0-9a-fA-F]{10} | ... |
| ... | ... | ... | ... | ... | ... | ... | ... | ... |

FIG.15

| SERIAL NUMBER | COMMUNI-CATION SOURCE IP ADDRESS | COMMUNI-CATION DESTINA-TION IP ADDRESS | URL | FQDN | URL PATH PORTION | URL QUERY PORTION | UserAgent |
|---|---|---|---|---|---|---|---|
| 1 | 10.0.0.1 | 198.51.100.98 | http://www.example.com/ [a-zA-Z]{6}/index.php?test=[0-9]{1} | www.example.com | /[a-zA-Z]{6}/ index.php | test=[0-9]{1} | [0-9a-fA-F]{10} |
| 2 | 10.0.0.1 | 198.51.100.98 | http://www.example.com/ [a-zA-Z]{6}/index.php?test=[0-9]{2} | www.example.com | /[a-zA-Z]{6}/ index.php | test=[0-9]{2} | [0-9a-fA-F]{10} |
| 3 | 10.0.0.3 | 198.51.100.98 | http://www.example.com/ [a-zA-Z]{6}/index.php?test=[0-9]{3} | www.example.com | /[a-zA-Z]{6}/ index.php | test=[0-9]{3} | [0-9a-fA-F]{10} |
| 4 | 10.0.0.1 | 198.51.100.98 | http://www.example.com/ [a-zA-Z]{6}/index.php?test=[0-9]{4} | www.example.com | /[a-zA-Z]{6}/ index.php | test=[0-9]{4} | [0-9a-fA-F]{10} |
| 5 | 10.0.0.1 | 198.51.100.98 | http://www.example.com/ [a-zA-Z]{6}/index.php?test=[0-9]{5} | www.example.com | /[a-zA-Z]{6}/ index.php | test=[0-9]{5} | [0-9a-fA-F]{10} |
| ⋮ | ⋮ | ⋮ | ⋮ | ⋮ | ⋮ | ⋮ | ⋮ |

FIG.17

| SERIAL NUMBER | DATA CLASSIFI-CATION | DATA | NUMBER OF COMMUNI-CATION SOURCE IP ADDRESSES | NUMBER OF COMMUNI-CATION DESTINA-TION FQDNS | DEGREE OF POPULARITY IN COMMUNICATION SOURCE IP ADDRESSES | DEGREE OF POPULARITY IN COMMUNICATION DESTINATION FQDNS | DEGREE OF RARITY | ⋮ |
|---|---|---|---|---|---|---|---|---|
| 1 | URL PATH PORTION | /[a-zA-Z]{6}/index.php | 100 | 100 | 0.1 | 0.1 | 0.9 | ⋮ |
| 2 | URL PATH PORTION | /[0-9a-fA-F]{3}/test.php | 1000 | 1000 | 1.0 | 1.0 | 0.0 | ⋮ |
| ⋮ | ⋮ | ⋮ | ⋮ | ⋮ | ⋮ | ⋮ | ⋮ | ⋮ |
| 101 | URL QUERY PORTION | test=[0-9]{3} | 100 | 100 | 0.1 | 1.0 | 0.9 | ⋮ |
| 102 | URL QUERY PORTION | c=[a-zA-Z]{3} | 1000 | 200 | 1.0 | 0.2 | 0.8 | ⋮ |
| ⋮ | ⋮ | ⋮ | ⋮ | ⋮ | ⋮ | ⋮ | ⋮ | ⋮ |
| 201 | UserAgent | [0-9a-fA-F]{10} | 100 | 100 | 0.1 | 1.0 | 0.9 | ⋮ |
| 202 | UserAgent | [0-9a-zA-Z+/=]{8} | 1000 | 1000 | 1.0 | 0.1 | 0.9 | ⋮ |
| ⋮ | ⋮ | ⋮ | ⋮ | ⋮ | ⋮ | ⋮ | ⋮ | ⋮ |

FIG.19

| SERIAL NUMBER | COMMUNI-CATION SOURCE IP ADDRESS | COMMUNI-CATION DESTINA-TION IP ADDRESS | URL | FQDN | URL PATH PORTION | URL QUERY PORTION | UserAgent | DEGREE OF RARITY FOR URL PATH PORTION | DEGREE OF RARITY FOR URL QUERY PORTION | DEGREE OF RARITY FOR UserAgent | ... |
|---|---|---|---|---|---|---|---|---|---|---|---|
| 1 | 10.0.0.1 | 198.51.100.98 | http://www.example.com/[a-zA-Z]{6}/index.php?test=[0-9]{3} | www.example.com | /[a-zA-Z]{6}/index.php | test=[0-9]{3} | [0-9a-fA-F]{10} | 0.9 | 0.9 | 0.9 | ... |
| 2 | 10.0.0.1 | 192.0.2.1 | http://www.example.net/[0-9a-fA-F]{3}/test.php?c=[a-zA-Z]{3} | www.example.net | /[0-9a-fA-F]{3}/test.php | c=[a-zA-Z]{3} | [0-9a-zA-Z+/=]{8} | 0.2 | 0.2 | 0.2 | ... |
| ... | ... | ... | ... | ... | ... | ... | ... | ... | ... | ... | ... |

FIG.21

| SERIAL NUMBER | COMMUNI-CATION SOURCE IP ADDRESS | COMMUNI-CATION DESTINA-TION IP ADDRESS | SENDER PORT | DESTINATION PORT | URL | ⋮ |
|---|---|---|---|---|---|---|
| 1 | 10.0.0.1 | 198.51.100.98 | 51234 | 80 | http://www.example.com/ghijkl/index.php?test=456 | ⋮ |
| 2 | 10.0.0.2 | 192.0.2.100 | 50032 | 60320 | - | ⋮ |
| 3 | 10.0.0.2 | 192.0.2.100 | 12345 | 80 | http://www.example.com/test/hoge.php | ⋮ |
| ⋮ | ⋮ | ⋮ | ⋮ | ⋮ | ⋮ | ⋮ |
| 231 | 10.23.242.1 | 192.0.2.99 | 24323 | 23 | - | ⋮ |
| 232 | 10.22.2.145 | 203.0.113.10 | 12345 | 53 | - | ⋮ |
| 233 | 10.55.65.3 | 203.0.113.10 | 34567 | 80 | http://www.example.net/index.php?foo=8 | ⋮ |
| ⋮ | ⋮ | ⋮ | ⋮ | ⋮ | ⋮ | ⋮ |

TRAFFIC FEATURE INFORMATION EXTRACTION METHOD, TRAFFIC FEATURE INFORMATION EXTRACTION DEVICE, AND TRAFFIC FEATURE INFORMATION EXTRACTION PROGRAM

FIELD

The present invention relates to a traffic feature information extraction method, a traffic feature information extraction device, and a traffic feature information extraction program.

BACKGROUND

As the Internet is expanding, a cyberattack such as a distributed denial of service (DDoS) attack and spam mail transmission has increased rapidly. Most of these attacks are due to malicious software called malware. Attackers cause terminals or servers of ordinary users to be infected with malware and operate the malware to illegally control the terminals and the servers with the intention of collecting information or launching an additional attack. These attacks have become an issue of public concern recently. For this reason, measures for the cyberattack, mainly for the malware infection is urgently required.

As the measures for the cyberattack, measures taken on terminal and measures taken on network have been studied. The measures taken on terminal have been studied, including an approach using antivirus software and an approach using a host-based intrusion detection system (IDS) or a host-based intrusion prevention system (IPS). The measures taken on terminal are executed by software installed in a terminal.

Meanwhile, the measures taken on network have been studied, including an approach using a network-based IDS or a network-based IPS, and a firewall or a web application firewall (WAF). In the measures taken on network, an inspection device is disposed at a connection point on a network. Recently, a security information and event management (SIEM) service or the like that analyzes logs on a terminal or a device to discover a trace of an attack has been provided as well. In both of the measures taken on terminal and the measures taken on network, measures are planned based on feature information regarding known attacks prepared in advance.

Additionally, both of these measures taken on terminal and these measures taken on network collect information on communication relating to attacks. For example, a decoy system called a honeypot is used to collect communication peers and communication content in a malware infection attack and other cyberattacks, while a malware analysis system called a sandbox is used to actually execute malware thereon, thereby collecting communication peers and communication content about the malware. Meanwhile, an anti-spam mail system or an anti-DDoS system is used to collect communication peers and communication content in communication determined as an attack. Furthermore, the feature information is extracted from information on communication relating to attacks. At this time, in many cases, the feature information is automatically extracted from the information on communication relating to attacks using known techniques represented by machine learning.

In an approach for automatically extracting the feature information from the information on communication relating to attacks, the information on communication relating to attacks is summarized based on the categorization into respective items set in advance, for example, date and time, an Internet protocol (IP) address of a communication peer, a port number used in communication, and the number of times of communication and the amount of communication during a predetermined period. At this time, it is common to input an observed value for the date and time or the port number, while a statistic value such as an average value, a standard deviation, or a variance value is input for the number of times of communication or the amount of communication in some cases. Once the categorization has been completed and the summary values have been calculated, for example, a statistical outlier is searched for. When the outlier is discovered, communication relating to this value is determined as an attack and at the same time, this outlier in a relevant item is set as a rule for detecting attacks. Additionally, this value in the relevant item is identified as the feature information observed in attacks.

Furthermore, in regard to the discovered attack, for example, an IP address can be added to a black list and set as the feature information for determining communication in contact with this IP address as an attack. In some cases, a uniform resource locator (URL) of the communication peer is used to create the black list, in which case a regular expression is sometimes used to add the URL to the black list.

Usually, when traffic logs and alerts are collected from different types of devices and software to extract information on communication peers and communication content, description methods for the respective items differ in some cases depending on the types of devices and software. Recently, a technique that converts log information expressed in different types of description to a uniform description method to summarize has been also spread as a security information and event management (STEM) product.

Non Patent Literature 1: R. Perdisci, W. Lee, and N. Feamster, "Behavioral Clustering of HTTP-Based Malware and Signature Generation Using Malicious Network Traces.," NSDI, p. 26, April 2010.

Non Patent Literature 2: Y. Xie, F. Yu, K. Achan, R. Panigrahy, G. Hulten, and I. Osipkov, "Spamming Botnets: Signatures and Characteristics," Proceedings of the ACM SIGCOMM 2008 conference on Data communication—SIGCOMM '08, vol. 38, no. 4, p. 171, August 2008.

In the aforementioned conventional technique, however, there is a problem in that the extraction of accurate feature information of attacks is cost consuming.

Specifically, the problem is that a risk is generated when harmless communication is mixed in the information on communication relating to attacks while being collected because the feature information of the harmless communication is mistakenly extracted and a rule formed by the extraction of this information is incorrectly determined as a rule for identifying a malicious traffic log.

For example, the malware often accesses a legitimate web site or the like for the purpose of disturbing analysis or confirming the connection to the Internet. For this reason, there is a possibility of normal access to a legitimate web site being mixed in communication peers and communication content about the malware collected using the sandbox.

Approaches for carefully examining the content of the communication relating to attacks have been studied, including an approach that collects information on the Internet to check the reputation of communication peers and an approach that reproduces the collected communication content on the antivirus software, the IDS, the IPS, the WAF, or the like to inspect whether the determination as an attack is obtained. Regardless of this, there is still a possibility of detection omission or misdetection occurring even according to the respective approaches. It is therefore difficult to automatically and correctly extract communication information on attacks from the information on communication relating to attacks. In particular, the detection omission can be allowed in some cases as it means that an attack that cannot be discovered even with other means cannot be discovered. However, the misdetection must be suppressed to the largest extent possible to prevent the operation cost, for example, for actions and investigation required after the detection from being generated.

In present days, accordingly, in order to identify a rule for discovering an attack and extracting the feature information of the attack, an analyzer is required to manually analyze the content in most cases. As a result, a time cost and a human cost are needed to extract the feature information of attacks and thus, in recent years when attacks are varying to different types, these costs act as a huge bottleneck for a security vendor or a service provider.

The disclosed technique has been made in consideration of the aforementioned situation and an object thereof is to extract accurate feature information of attacks at low cost.

SUMMARY

According to the embodiments of the invention, a traffic feature information extraction method to be executed in a traffic feature information extraction device includes a regular expression step of extracting an item set in advance from a traffic log and representing a partial character string included in the item in a regular expression based on a predetermined rule, a clustering step of clustering an entry of the traffic log represented in the regular expression, and a feature information extraction step of extracting, as traffic feature information of each of clusters, an entry having a minimum total sum of distances among entries included in the traffic logs clustered in the clustering step.

Advantageous Effects of Invention

According to an aspect of a traffic feature information extraction method, a traffic feature information extraction device, and a traffic feature information extraction program to be disclosed, an effect that enables the extraction of accurate feature information of attacks at low cost is achieved.

BRIEF DESCRIPTION OF DRAWINGS

FIG. 2 is a diagram illustrating exemplary items for traffic logs according to the first embodiment.

FIG. 3 is a diagram illustrating exemplary items for traffic logs according to the first embodiment.

FIG. 4 is a diagram illustrating exemplary items for a regular expression pattern table according to the first embodiment.

FIG. 5 is a diagram illustrating exemplary items for a word list table according to the first embodiment.

FIG. 9 is a diagram illustrating exemplary items for regular expression traffic logs according to the first embodiment.

FIG. 10 is a diagram illustrating exemplary items for regular expression traffic logs according to the first embodiment.

FIG. 12 is a diagram illustrating an example of a clustering result according to the first embodiment.

FIG. 13 is a diagram illustrating another example of a clustering result according to the first embodiment.

FIG. 15 is a diagram for explaining a processing action by the feature information extraction unit according to the first embodiment when extracting the traffic feature information from each of clusters.

FIG. 17 is a diagram for explaining a processing action by the refinement unit according to the first embodiment when calculating statistic values within the traffic logs using the regular expression traffic logs.

FIG. 19 is a diagram illustrating an example of a result of check processing by the refinement unit according to the first embodiment.

FIG. 21 is a diagram illustrating an example of a comparison result according to the first embodiment.

DESCRIPTION OF EMBODIMENTS

Hereinafter, embodiments of a traffic feature information extraction method, a traffic feature information extraction device, and a traffic feature information extraction program to be disclosed will be described in detail based on the drawings. The embodiments are not construed to limit the invention to be disclosed.

[a] First Embodiment

Figure 1:
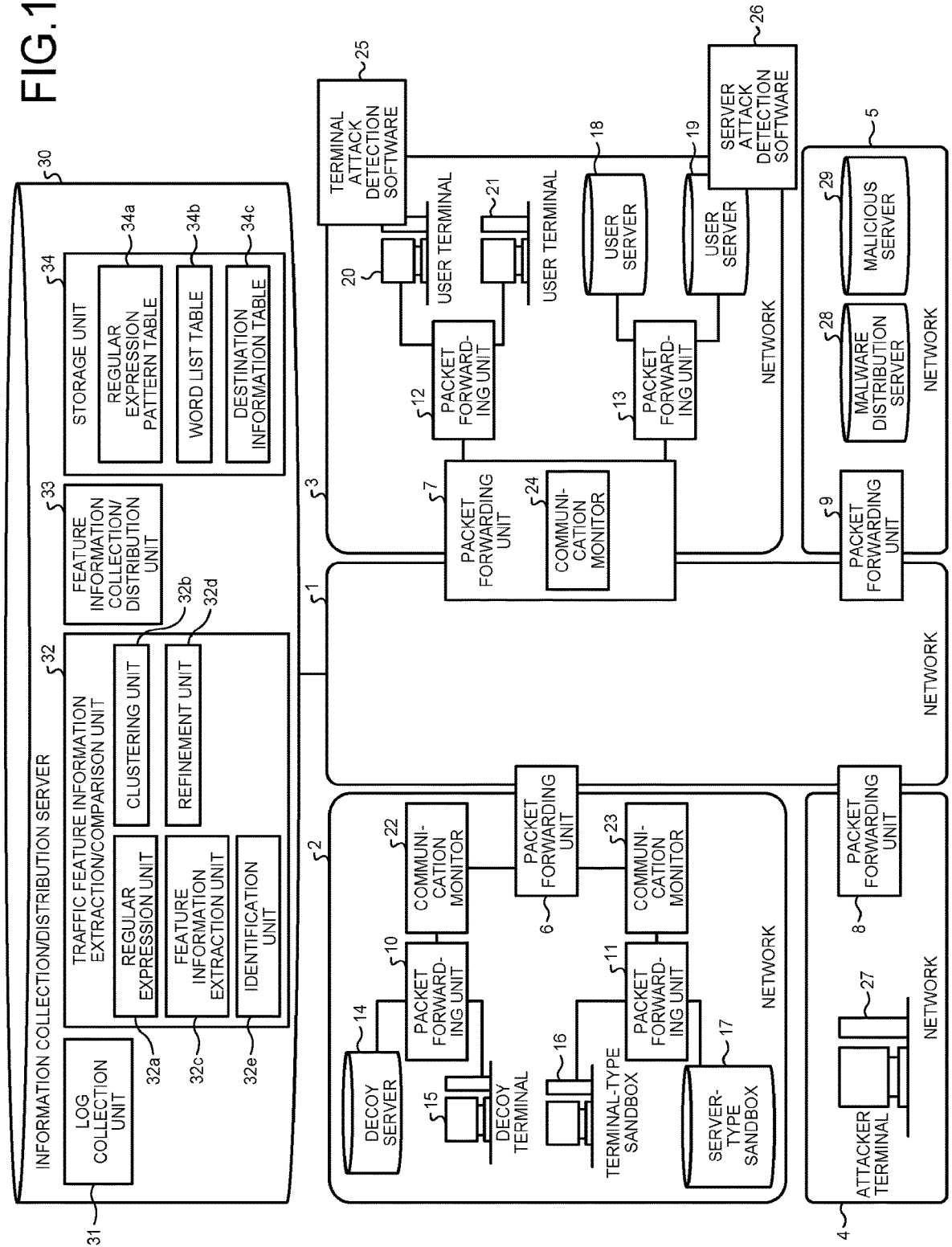
FIG. 1 is a diagram illustrating an exemplary configuration of a network system including an information collection/distribution server according to a first embodiment.

FIG. 1 is a diagram illustrating an exemplary configuration of a network system including an information collection/distribution server 30 according to a first embodiment. As illustrated in FIG. 1, the information collection/distribution server 30 according to the first embodiment is connected to networks 2, 3, 4 and 5 through a network 1. The information collection/distribution server 30 is also referred to as "traffic feature information extraction device."

The network 1 may be a wide area network such as the Internet, or alternatively, may be a relatively small area network such as an intranet. This network 1 contains the networks 2 to 5. The networks 2 to 5 are interconnected through packet forwarding units 6 to 9 described later so as to be able to communicate with one another. Hereinafter, the network 2 and the network 3 are described as "networks to be protected," whereas the network 4 and the network 5 are described as "attacker networks."

The network 2 is a network provided to analyze a malware infection attack and includes, for example, a decoy server 14, a decoy terminal 15, a terminal-type sandbox 16, and a server-type sandbox 17. An open-sourced honeypot provided by The Honeynet Project or a honeypot developed independently may be applied to the decoy server 14 and the decoy terminal 15. Meanwhile, not only a product represented by FireEye but also open-sourced software, or alternatively, a sandbox developed independently may be applied to the terminal-type sandbox 16 and the server-type sandbox 17.

As illustrated in FIG. 1, the network 2 also includes the packet forwarding unit 6, a packet forwarding unit 10, a packet forwarding unit 11, a communication monitor 22, and a communication monitor 23. The packet forwarding unit 6 controls transmission/reception of a packet between the network 2 and other networks, while controlling transmission/reception of a packet within the network 2. The packet forwarding unit 10 connects the decoy server 14 and the decoy terminal 15 to each other on the network 2 and also connects the decoy server 14 and the decoy terminal 15 to the terminal-type sandbox 16 and the server-type sandbox 17, and to other networks as well through the packet forwarding unit 6. The packet forwarding unit 11 connects the terminal-type sandbox 16 and the server-type sandbox 17 to each other on the network 2 and also connects the terminal-type sandbox 16 and the server-type sandbox 17 to the decoy server 14 and the decoy terminal 15, and to other networks as well through the packet forwarding unit 6. A packet output function in which header information such as a media access control (MAC) address, an Internet protocol (IP) address, a port number, or an HTTP header is referred to when forwarding destination is determined is available as the packet forwarding unit 6, the packet forwarding unit 10, and the packet forwarding unit 11, specifically including a switch or a router, a switch function or a router function, port forwarding, and a hypertext transfer protocol (hereinafter, referred to as HTTP) forwarding function.

The communication monitor 22 collects traffic logs. The communication monitor 23 collects traffic logs. Many types of information that can be collected by the respective communication monitors can be assumed here as the traffic log, including log information and alert information, packet capture (pcap) information obtained by capturing a packet, and syslog information on a server. The log information collected at the decoy server 14, the decoy terminal 15, the terminal-type sandbox 16, and the server-type sandbox 17 has a possibility of being applicable as a malicious traffic log relating to attacks. The communication monitor 22 and the communication monitor 23 serve as functions for monitoring information used in forwarding and a packet payload and, in addition to a security appliance, a proxy, the antivirus software, and the like, the packet forwarding unit that saves a forwarded packet to the inside/outside of the device is available as the communication monitors 22 and 23.

In some cases, the communication monitor 22 and the communication monitor 23 are additionally provided with a function for retaining specific information to detect communication matching this information or provided with a function for blocking this communication or forwarding this communication to another additional function. In particular, the communication monitor 22 and the communication monitor 23 can be provided with a function for storing a feature of an attack as the specific information to detect the attack when communication matching this information is determined as an attack or provided with a function for blocking this attack or forwarding this attack to another additional function called quarantine.

The network 3 includes, for example, a user server 18, a user server 19, a user terminal 20, and a user terminal 21. All or some of the user server 18, the user server 19, the user terminal 20, and the user terminal 21 disposed on this network 3 are treated as objects for which transmission/reception of a specific type of communication is to be confirmed.

As illustrated in FIG. 1, the network 3 also includes the packet forwarding unit 7, a packet forwarding unit 12, and a packet forwarding unit 13. The packet forwarding unit 7 controls transmission/reception of a packet between the network 3 and other networks, while controlling transmission/reception of a packet within the network 3. The packet forwarding unit 12 connects the user terminal 20 and the user terminal 21 to each other on the network 3 and also connects the user terminal 20 and the user terminal 21 to the user server 18 and the user server 19, and to other networks as well through the packet forwarding unit 7. The packet forwarding unit 13 connects the user server 18 and the user server 19 to each other on the network 3 and also connects the user server 18 and the user server 19 to the user terminal 20 and the user terminal 21, and to other networks as well through the packet forwarding unit 7.

The packet forwarding unit 7 also includes a communication monitor 24. Unlike the communication monitor 22 and the communication monitor 23 disposed within the network 2 as devices, this communication monitor 24 is disposed within the packet forwarding unit 7 as one function. The communication monitor 24 collects the traffic logs.

In addition, terminal attack detection software 25 is installed in the user terminal 20 and the user terminal 21. Likewise, server attack detection software 26 is installed in the user server 18 and the user server 19. The terminal attack detection software 25 and the server attack detection software 26 are constituted by antivirus software, host-based IDSs/IPSs, or the like and collect the traffic logs. Accordingly, both of the terminal attack detection software 25 and the server attack detection software 26 are included in the communication monitor.

Many types of information that can be collected by the communication monitor can be assumed here as the traffic log, including the log information and the alert information, the pcap information obtained by capturing a packet, and the syslog information on a server. A log of traffic determined as an attack by the communication monitor including the terminal attack detection software 25 and the server attack detection software 26 also has a possibility of being applicable as the malicious traffic log.

On the other hand, for example, in a case where the communication monitor 24 disposed on the network 3 has not detected an attack, the traffic log collected by the communication monitor 24 has a possibility of being applicable as a harmless traffic log. Usually, when the traffic logs and the alerts are collected from different types of devices and software to extract information on communication peers and communication content, description methods for respective items differ in some cases depending on the types of devices and software. For a solution to this, a technique that converts the log information expressed in different types of description to a uniform description method to summarize has been recently spread as a security information and event management (SIEM) product.

The network 4 includes an attacker terminal 27 that attacks a specific type of communication. As illustrated in FIG. 1, the network 4 includes the packet forwarding unit 8. The packet forwarding unit 8 controls transmission/reception of a packet between the network 4 and other networks.

The network 5 includes a malicious server 29 that forwards the user terminal that has accessed thereto to another server to attack, a malware distribution server 28 that distributes malware to the user server and the user terminal that have accessed thereto, or the like. As illustrated in FIG. 1, the network 5 includes the packet forwarding unit 9. The packet forwarding unit 9 controls transmission/reception of a packet between the network 5 and other networks.

The information collection/distribution server 30 extracts the traffic feature information from at least one of the traffic log generated by malware and a certain traffic log to be protected. The information collection/distribution server 30 also compares the extracted traffic feature information with a certain traffic log to be protected. Hereinafter, a detailed configuration of the information collection/distribution server 30 will be described.

Here, prior to describing the detailed configuration of the information collection/distribution server 30, the traffic log collected by the information collection/distribution server 30 will be described with reference to FIG. 2 and FIG. 3. FIG. 2 is a diagram illustrating exemplary items for the traffic logs according to the first embodiment. FIG. 2 illustrates exemplary items for the traffic logs generated by malware. The traffic logs that can be collected are different depending on software and equipment. For example, when pcap data or the like can be saved, a large amount of information can be collected. Compared to this, although a proxy server or the like can record data of the HTTP header, data that can be observed on average network equipment such as the router and the switch is often limited to the number of frames and packets per the IP address or the port number, and the like.

As illustrated in FIG. 2, the traffic logs generated by malware are recorded in such a manner that "serial number," "malware identifier," "communication source IP address," "communication destination IP address," "sender port," "destination port," and "URL" are associated. The exemplary items to be recorded are not limited to the ones illustrated in FIG. 2. For example, in addition to "serial number," "malware identifier," "communication source IP address," "communication destination IP address," "sender port," "destination port," and "URL," another item that can identify a communication source and a communication destination may be recorded as the traffic log. Alternatively, any of "serial number," "malware identifier," "communication source IP address," "communication destination IP address," "sender port," "destination port," "URL," and another item that can identify the communication source and the communication destination may be recorded as the traffic log.

"Serial number" here represents the order of entries recorded as the traffic logs. For example, a data value such as "1" indicating that the entry is recorded at a first place or "2" indicating that the entry is recorded at a second place is stored to "serial number." "Malware identifier" represents an identifier indicating by which malware sample the relevant traffic is generated. A hash value defined uniquely to each malware sample can be given as this malware identifier, or alternatively, information from a table for administration can be separately given. For example, a data value such as "M1" or "M2" is stored to "malware identifier."

"Communication source IP address" represents an IP address of a communication source of a packet. For example, a data value such as "10.0.0.1" or "10.0.0.2" is stored to "communication source IP address." "Communication destination IP address" represents an IP address of a communication destination of a packet. For example, a data value such as "198.51.100.98" or "192.0.2.100" is stored to "communication destination IP address."

"Sender port" represents a sender port from which a packet has been sent. For example, a data value such as "51234" or "50032" is stored to "sender port." "Destination port" represents a destination port of a packet. For example, a data value such as "80" or "60320" is stored to "destination port." "URL" represents a URL of an access destination. For example, a data value such as "http://www.example.com/abcdef/index.php?test=123" or "http://www.example.com/test/image.php" is stored to "URL."

To give an example, the traffic logs illustrated in FIG. 2 indicate that an entry of traffic log having "1" in "serial number" is a traffic log generated by a malware identifier "M1," the communication source thereof is an IP address "10.0.0.1," and the communication destination thereof is an IP address "198.51.100.98." In addition, the traffic logs illustrated in FIG. 2 indicate that the sender of the entry of traffic log having "1" in "serial number" is a port "51234," the destination thereof is a port "80," and "http://www.example.com/abcdef/index.php?test=123" is included therein as URL information.

As the traffic log, data can be recorded for each of access, or data can be recorded for each of received frames or packets. Alternatively, data of multisession can be recorded. In the first embodiment, logs of traffic included in data collected at a honeypot, data collected at a sandbox, and data determined as the malicious traffic log by an existing technique are indicated as the traffic logs generated by malware.

FIG. 3 is a diagram illustrating exemplary items for the traffic logs according to the first embodiment. FIG. 3 illustrates exemplary items for the traffic logs on a network to be protected. As in FIG. 2, the traffic logs that can be collected are different depending on software and equipment.

As illustrated in FIG. 3, the traffic logs on the network to be protected are recorded in such a manner that "serial number," "communication source IP address," "communication destination IP address," "sender port," "destination port," and "URL" are associated.

Here, the respective items recorded as the traffic logs on the network to be protected are similar to the respective items recorded as the traffic logs generated by malware. The exemplary items to be recorded are not limited to the ones illustrated in FIG. 3. For example, in addition to "serial number," "communication source IP address," "communication destination IP address," "sender port," "destination port," and "URL," another item that can identify a communication source and a communication destination may be recorded as the traffic log. Alternatively, any of "serial number," "malware identifier," "communication source IP address," "communication destination IP address," "sender port," "destination port," "URL," and another item that can identify the communication source and the communication destination may be recorded as the traffic log.

To give an example, the traffic logs illustrated in FIG. 3 indicate that the communication source of an entry of traffic log having "1" in "serial number" is an IP address "10.0.0.1" and the communication destination thereof is an IP address "198.51.100.98." In addition, the traffic logs illustrated in FIG. 3 indicate that the sender of the entry of traffic log having "1" in "serial number" is a port "51234," the destination thereof is a port "80," and "http://www.example.com/ghijkl/index.php?test=456" is included therein as URL information.

Subsequently, the configuration of the information collection/distribution server 30 will be described with reference to FIG. 1. As illustrated in FIG. 1, the information collection/distribution server 30 includes a log collection unit 31, a traffic feature information extraction/comparison unit 32, a feature information collection/distribution unit 33, and a storage unit 34.

The storage unit 34 is, for example, a storage device such as a semiconductor memory element or a hard disk and includes a regular expression pattern table 34a, a word list table 34b, and a destination information table 34c.

The regular expression pattern table 34a stores information indicating a predetermined rule for representing the traffic log in the regular expression. FIG. 4 is a diagram illustrating exemplary items for the regular expression pattern table 34a according to the first embodiment. As illustrated in FIG. 4, the regular expression pattern table 34a stores information in which "serial number," "character classification," and "regular expression pattern" are associated. Here, "serial number" stored in the regular expression pattern table 34a represents identification information of the entry stored in the regular expression pattern table 34a. For example, a data value such as "1" or "2" is stored to "serial number."

"Character classification" stored in the regular expression pattern table 34a represents a classification of a character string present in the traffic feature information. For example, a data value such as "alphabetical character," "integer," "hexadecimal number," or "Base64" is stored to "character classification." "Character classification" is not limited to the example illustrated in FIG. 4.

"Regular expression pattern" stored in the regular expression pattern table 34a represents a rule for representing the character string in the regular expression. For example, a data value such as "[a-zA-Z]" or "[0-9]" is stored to "regular expression pattern."

To give an example, the regular expression pattern table 34a illustrated in FIG. 4 indicates that a character string constituted by five successive alphabetical characters is noted as [a-zA-Z]{5} when replaced with the regular expression pattern. In this case, a numeral in curly brackets represents the number of characters. Some of the items for the traffic feature information can include a non-printable character. There is a case where the non-printable character is not included into an object to be replaced with the regular expression pattern. However, the non-printable character may be uniquely converted to a printable character in accordance with a procedure separately defined so as to be replaced with the regular expression pattern.

The word list table 34b stores information indicating whether a partial character string included in the item extracted from the traffic log is represented in the regular expression. In other words, the word list table 34b stores information indicating a partial character string not to be represented in the regular expression. FIG. 5 is a diagram illustrating exemplary items for the word list table 34b according to the first embodiment. These exemplary items indicate an example where words are extracted from a character string appearing in the URL of the traffic generated by malware, which is illustrated in FIG. 2, to create a word list. A procedure for creating the word list table 34b will be described later with reference to FIG. 22.

As illustrated in FIG. 5, the word list table 34b stores information in which "serial number" and "word" are associated. Here, "serial number" stored in the word list table 34b represents identification information of the entry stored in the word list table 34b. For example, a data value such as "1" or "2" is stored to "serial number."

"Word" stored in the word list table 34b represents a partial character string included in the item extracted from the traffic log. For example, a data value such as "index," "php," or "test" is stored to "word."

To give an example, the word list table 34b illustrated in FIG. 5 indicates that, in a case where "index," "php," or "test" is included in the item extracted from the traffic log, these partial character strings are not represented in the regular expression.

Figures 6, 7:
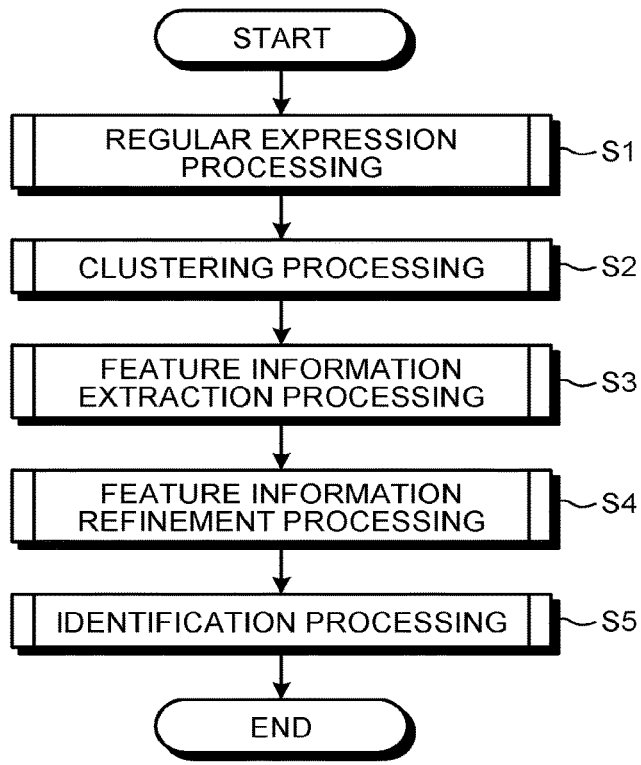
FIG. 6 is a diagram illustrating exemplary items for a destination information table according to the first embodiment.
FIG. 7 is a flowchart illustrating a flow of entire processing by the information collection/distribution server according to the first embodiment.

The destination information table 34c stores information indicating a destination of communication or destination information corresponding to a destination of communication. FIG. 6 is a diagram illustrating exemplary items for the destination information table 34c according to the first embodiment. As illustrated in FIG. 6, the destination information table 34c stores information in which "serial number," "IP address," "address prefix," "AS number," and "organization name" are associated.

Here, "serial number" stored in the destination information table 34c represents identification information of the entry stored in the destination information table 34c. For example, a data value such as "1" or "2" is stored to "serial number." "IP address" stored in the destination information table 34c represents an IP address of a communication destination. For example, a data value such as "192.0.2.100" or "198.51.100.98" is stored to "IP address."

"Address prefix" stored in the destination information table 34c represents a portion of a network address within the IP address. Here, the address prefix is noted along with a prefix length following "/(slash)." For example, a data value such as "192.0.2.0/24" or "198.51.100.0/24" where 24 bits from the beginning serve as the address prefix is stored to "address prefix."

"AS number" stored in the destination information table 34c represents a number that identifies an independent network (autonomous system (AS)) owned and operated by each of organizations present within a large scale IP network such as the Internet. For example, a data value such as "64500" or "64501" is stored to "AS number." "Organization name" stored in the destination information table 34c represents an organization owning and operating the AS. For example, a data value such as "TEST-NET-1" or "TEST-NET-2" is stored to "organization name."

The example illustrated in FIG. 6 depicts a case where the address prefix information, the autonomous system (AS) number, and the organization name corresponding to a certain IP address are extracted as the items for the destination information. However, the items are not limited thereto. Additionally, "address prefix," "AS number," and "organization name" stored in the destination information table 34c are publicly available information and, for example, this destination information can be retrieved using the GeoIP service by MaxMind, Inc., or alternatively, can be created by individually collecting information.

To give an example, the destination information table 34c illustrated in FIG. 6 indicates that an IP address "192.0.2.100" has a destination of which the address prefix is "192.0.2.0/24," the AS number is "64500," and the organization name is "TEST-NET-1."

The description returns to FIG. 1. The log collection unit 31 collects the traffic logs from the respective communication monitors. For example, the log collection unit 31 collects the traffic logs from the communication monitor 22 and the communication monitor 23 on the network 2, the communication monitor 24 on the network 3, and the terminal attack detection software 25 and the server attack detection software 26. Meanwhile, the traffic logs may be input to the log collection unit 31 through operation by an operator.

The traffic feature information extraction/comparison unit 32 includes a regular expression unit 32a, a clustering unit 32b, a feature information extraction unit 32c, a refinement unit 32d, and an identification unit 32e to carry out an approach for extracting and comparing the traffic feature information.

The regular expression unit 32a extracts an item set in advance from at least one of the traffic log generated by malware and a certain traffic log to be protected to represent a partial character string included in that item in the regular expression based on a predetermined rule.

The clustering unit 32b clusters the entry of the traffic log represented in the regular expression. For example, the clustering unit 32b uses an approach in which an item for the destination of communication or the destination information corresponding to the destination of communication is used to cluster the traffic log in accordance with the items and the granularity set in advance (approach A). Alternatively, the clustering unit 32b uses an approach in which respective items in header information or data information included in a combination of protocols used in a protocol stack for communication is used to cluster the traffic log in accordance with the items set in advance (approach B). The clustering unit 32b uses at least one of the approach A and the approach B to cluster the traffic log represented in the regular expression.

The feature information extraction unit 32c defines a distance between entries included in the clustered traffic logs using a method specified in advance to extract, as the traffic feature information of each of clusters, an entry having a minimum total sum of distances between an entry and respective entries other than that entry included within each of the clusters.

The refinement unit 32d calculates a statistic value within the traffic logs using these traffic logs represented in the regular expression in accordance with an indicator set in advance to refine the amount of features based on the feature information extracted from the clustered traffic logs and the statistic value.

The identification unit 32e compares the refined feature information and a certain traffic log on the network to be protected to calculate a score using an indicator set in advance and identifies an entry having the score equal to or larger than a threshold within the traffic logs to thereby identify at least one of a sender host and a transmission destination of that entry.

The feature information collection/distribution unit 33 distributes new feature information to the respective communication monitors as a monitoring object list. For example, the feature information collection/distribution unit 33 distributes new feature information as the monitoring object list to the communication monitor 22 and the communication monitor 23 on the network 2, the communication monitor 24 on the network 3, and the terminal attack detection software 25 and the server attack detection software 26.

In a case where a specific type of communication is set as an attack, a mechanism for the distribution of the monitoring object list by the feature information collection/distribution unit 33 is similar to a mechanism for the distribution of a signature to a security appliance or antivirus software by a security vendor. In this case, the security vendor collects information from a decoy server, a decoy terminal, a security appliance, and antivirus software owned by that security vendor itself to generate a signature.

Hereinafter, processing will be described with reference to FIG. 7 to FIG. 22 in respect to a processing procedure by the information collection/distribution server 30. FIG. 7 is a flowchart illustrating a flow of entire processing by the information collection/distribution server 30 according to the first embodiment.

As illustrated in FIG. 7, the regular expression unit 32a of the information collection/distribution server 30 carries out regular expression processing that represents the traffic log in the regular expression (step S1).

Subsequently, the clustering unit 32b of the information collection/distribution server 30 carries out clustering processing that clusters the traffic log represented in the regular expression (step S2). Thereafter, the feature information extraction unit 32c of the information collection/distribution server 30 carries out feature information extraction processing that extracts the feature information from the clustered traffic logs (step S3).

Additionally, the refinement unit 32d of the information collection/distribution server 30 carries out feature information refinement processing that refines the extracted feature information (step S4). The identification unit 32e of the information collection/distribution server 30 then carries out identification processing that compares the refined feature information and a certain traffic log on the network to be protected to identify, for example, a terminal infected with malware (step S5).

Figure 8:
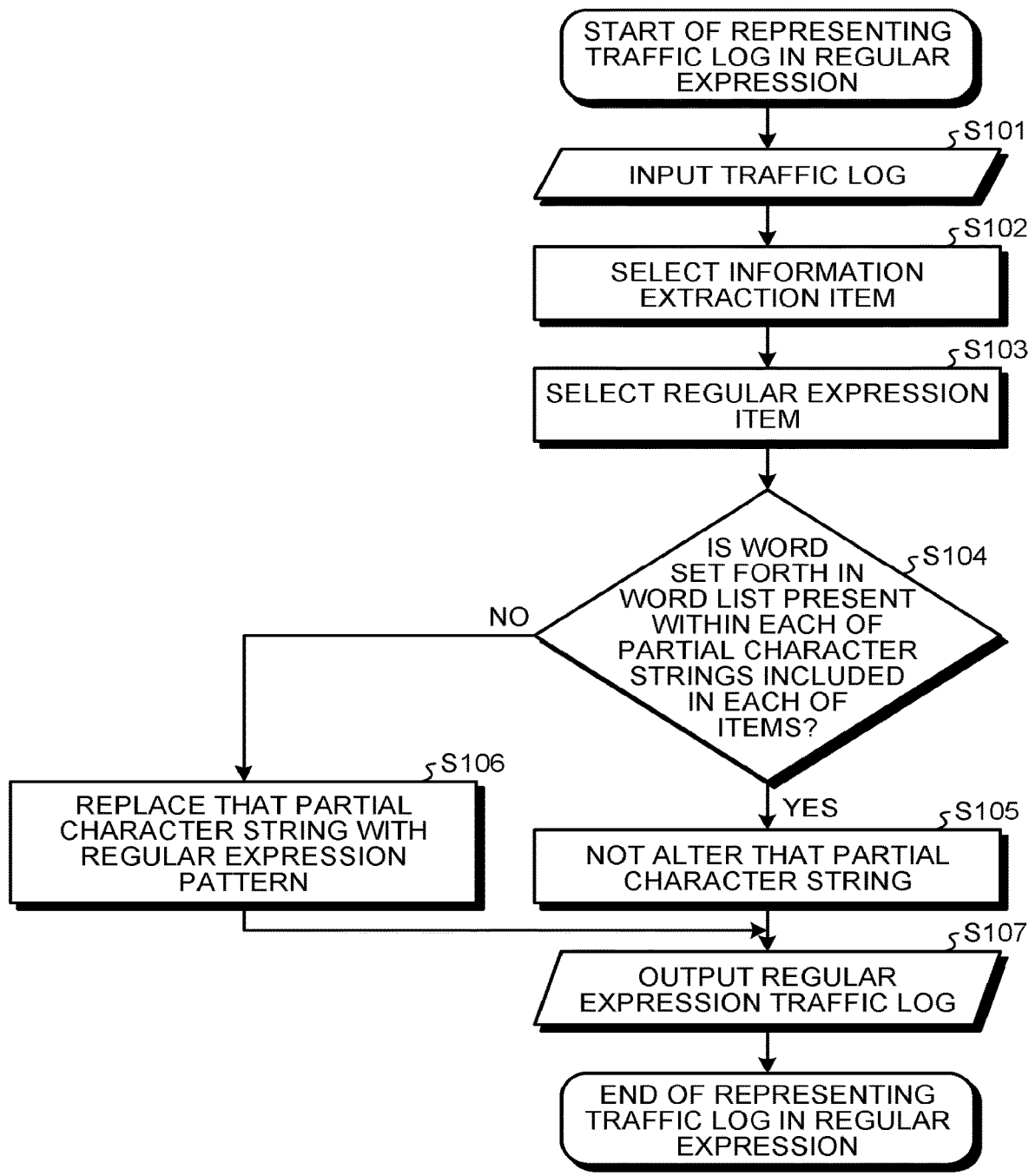
FIG. 8 is a flowchart illustrating a procedure of regular expression processing for the traffic log by a regular expression unit of the information collection/distribution server according to the first embodiment.

Next, details will be described in respect to each of the processing carried out by the information collection/distribution server 30. FIG. 8 is a flowchart illustrating a procedure of the regular expression processing for the traffic log by the regular expression unit 32a of the information collection/distribution server 30 according to the first embodiment. As illustrated in FIG. 8, the traffic log generated by malware or the traffic log on the network to be protected is input to the regular expression unit 32a (step S101).

Subsequently, the regular expression unit 32a selects an information extraction item from the traffic log (step S102). For example, the regular expression unit 32a selects an item to be extracted from the traffic log. The first embodiment will describe an example where the regular expression unit 32a selects the communication source IP address, the communication destination IP address, the URL, an FQDN, a URL path portion, a URL query portion, and UserAgent. The regular expression unit 32a can select any items within the traffic log.

Thereafter, the regular expression unit 32a selects a regular expression item (step S103). Although the regular expression unit 32a also can represent all of the extracted items in the regular expression, the first embodiment will describe an example where the regular expression unit 32a selects the URL path portion, the URL query portion, and UserAgent as the items to be represented in the regular expression.

Following this, the regular expression unit 32a determines whether a word set forth in the word list table 34b is present within each of partial character strings included in each of the items (step S104). Here, when it is determined that the word set forth in the word list table 34b is present within each of these partial character strings included in each of these items (step S104: Yes), the regular expression unit 32a does not alter that partial character string (step S105). On the other hand, when it is not determined that the word set forth in the word list table 34b is present within each of these partial character strings included in each of these items (step S104: No), the regular expression unit 32a refers to the regular expression pattern table 34a to replace that partial character string with the regular expression pattern (step S106).

The regular expression unit 32a outputs a result obtained by carrying out step S105 or step S106 to the clustering unit 32b as a regular expression traffic log (step S107). For example, the regular expression unit 32a outputs the regular expression traffic logs illustrated in FIG. 9 and FIG. 10 to the clustering unit 32b.

FIG. 9 is a diagram illustrating exemplary items for the regular expression traffic logs according to the first embodiment. FIG. 9 illustrates an example where the traffic logs generated by malware, which are illustrated in FIG. 2, are represented in the regular expression. In addition, FIG. 9 illustrates a case where the communication source IP address, the communication destination IP address, the URL, the FQDN corresponding to a partial character string in the URL, the URL path portion, the URL query portion, and UserAgent, which are used in the protocol stack for TCP/IP, are specified as the items set in advance. FIG. 9 also illustrates exemplary items in a case where the regular expression pattern in FIG. 4 and the word list in FIG. 5 are used in the representation using the regular expression. The exemplary items and the order of the items are not limited to the example illustrated in FIG. 9.

FIG. 10 is a diagram illustrating exemplary items for the regular expression traffic logs according to the first embodiment. FIG. 10 illustrates an example where the traffic logs on the network to be protected, which are illustrated in FIG. 3, are represented in the regular expression. In addition, FIG. 10 illustrates a case where the communication source IP address, the communication destination IP address, the URL, the FQDN corresponding to a partial character string in the URL, the URL path portion, the URL query portion, and UserAgent, which are used in the protocol stack for TCP/IP, are specified as the items set in advance. FIG. 10 also illustrates exemplary items in a case where the regular expression pattern in FIG. 4 and the word list in FIG. 5 are used in the representation using the regular expression. The exemplary items and the order of the items are not limited to the ones illustrated in FIG. 10.

Figure 11:
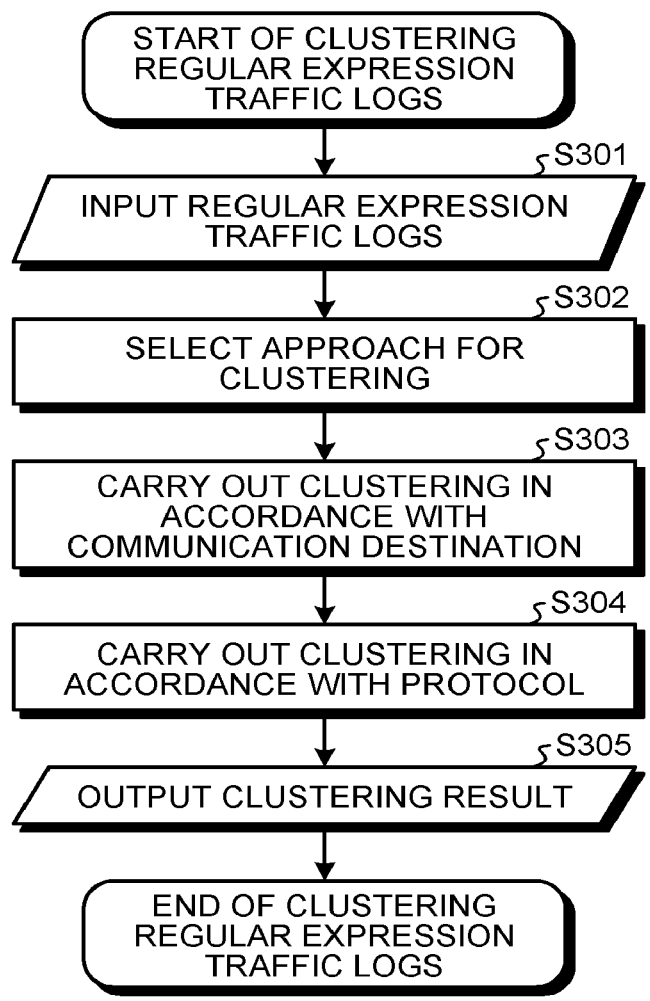
FIG. 11 is a flowchart illustrating a procedure of clustering processing by a clustering unit of the information collection/distribution server according to the first embodiment.

FIG. 11 is a flowchart illustrating a procedure of the clustering processing by the clustering unit 32b of the information collection/distribution server 30 according to the first embodiment. As illustrated in FIG. 11, the regular expression traffic logs are input to the clustering unit 32b (step S301).

Following this, the clustering unit 32b selects an approach for clustering (step S302). The example in FIG. 11 will describe a case where the clustering unit 32b selects both of communication destination clustering and protocol clustering to carry out the communication destination clustering and the protocol clustering in this order during the clustering processing.

The clustering unit 32b carries out the clustering in accordance with the communication destination (step S303). The clustering unit 32b here handles entries having the same communication destination IP address as the same cluster and obtains a clustering result illustrated in FIG. 12.

FIG. 12 is a diagram illustrating an example of the clustering result according to the first embodiment.

FIG. 12 illustrates an exemplary result of clustering the traffic logs using the item for the destination of communication or the destination information corresponding to the destination of communication. FIG. 12 illustrates an exemplary case where the traffic feature information having the same communication destination IP address is set as the same cluster among the regular expression traffic logs. The clustering unit 32b not only treats, as the same cluster, the traffic feature information having completely the same destination information as illustrated in FIG. 12 but also may carry out the clustering using the destination information table 34c illustrated in FIG. 6 or may define a distance between respective entries of the destination information such that entries of the destination information having a distance therebetween equal to or smaller than a certain distance are deemed as being identical when the clustering is carried out. In the example illustrated in FIG. 12, the traffic feature information treated as the same cluster is expressed as white-colored entries. Specifically, the serial number 1, the serial number 2, and the serial number 4 in FIG. 12 are designated as the same cluster.

The description returns to FIG. 11. The clustering unit 32b carries out the clustering in accordance with the protocol using the clustering result illustrated in FIG. 12 as input (step S304). It is assumed here that the clustering unit 32b categorizes the regular expression traffic logs into the same cluster when these regular expression traffic logs have the same FQDN, the same URL path portion, the same URL query portion, and the same UserAgent. The clustering unit 32b outputs, for example, a clustering result illustrated in FIG. 13 to the feature information extraction unit 32c (step S305).

FIG. 13 is a diagram illustrating another example of the clustering result according to the first embodiment. FIG. 13 illustrates an example of the clustering using respective items in the header information or the data information of a communication protocol. In FIG. 13, an example is illustrated in which the regular expression traffic logs are clustered using the HTTP as the communication protocol and an HTTP header as the item. In particular, FIG. 13 illustrates an example where the traffic logs are categorized into the same cluster when these traffic logs have the same FQDN, the same URL path portion, the same URL query portion, and the same UserAgent. The clustering unit 32b not only treats, as the same cluster, the traffic logs having completely the same header information or the same data information that has been selected as illustrated in FIG. 13 but also may define a distance between respective entries of the header information or the data information such that the traffic logs having a distance therebetween equal to or smaller than a certain distance are deemed as being identical when the clustering is carried out. In the example illustrated in FIG. 13, the traffic logs treated as the same cluster are expressed as white-colored entries. Specifically, the serial number 1, the serial number 2, and the serial number 5 in FIG. 13 are designated as the same cluster.

Figure 14:
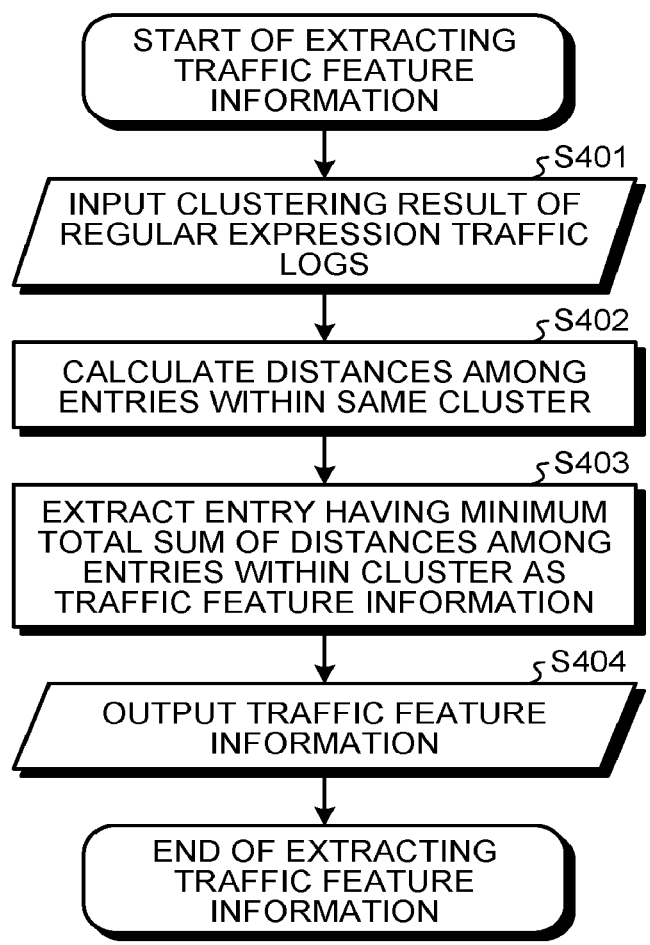
FIG. 14 is a flowchart illustrating a procedure of extraction processing for traffic feature information by a feature information extraction unit of the information collection/distribution server according to the first embodiment.

FIG. 14 is a flowchart illustrating a procedure of the extraction processing for the traffic feature information by the feature information extraction unit 32c of the information collection/distribution server 30 according to the first embodiment. As illustrated in FIG. 14, the clustering result of the regular expression traffic logs is input to the feature information extraction unit 32c (step S401). For example, the clustering result illustrated in FIG. 13 is input to the feature information extraction unit 32c.

Subsequently, the feature information extraction unit 32c calculates a total sum of distances between an entry and all entries other than that entry for each of the entries included in the same cluster (step S402).

Thereafter, the feature information extraction unit 32c deems an entry having a minimum total sum as a representative point of each of the clusters to extract that entry as the traffic feature information (step S403). In addition, the feature information extraction unit 32c outputs the extracted traffic feature information (step S404). For example, the feature information extraction unit 32c outputs the traffic feature information illustrated in FIG. 15.

FIG. 15 is a diagram for explaining a processing action by the feature information extraction unit 32c according to the first embodiment when extracting the traffic feature information from each of the clusters. FIG. 15 illustrates an example where the feature information extraction unit 32c extracts the traffic feature information from within the cluster when the cluster illustrated in FIG. 12 or FIG. 13 is formed. The description hereinafter uses an example where the feature information extraction unit 32c defines, as the distance, a difference in the number of characters in the regular expression for the URL query portion. In this case, the feature information extraction unit 32c determines that distances between the entry of the serial number "3" and the other entries of respective serial numbers have a minimum total sum. Accordingly, the feature information extraction unit 32c extracts the serial number "3" as the traffic feature information. In FIG. 15, the entry identified by the serial number "3" is designated as the traffic feature information and the extracted traffic feature information is expressed as a white-colored entry.

Figure 16:
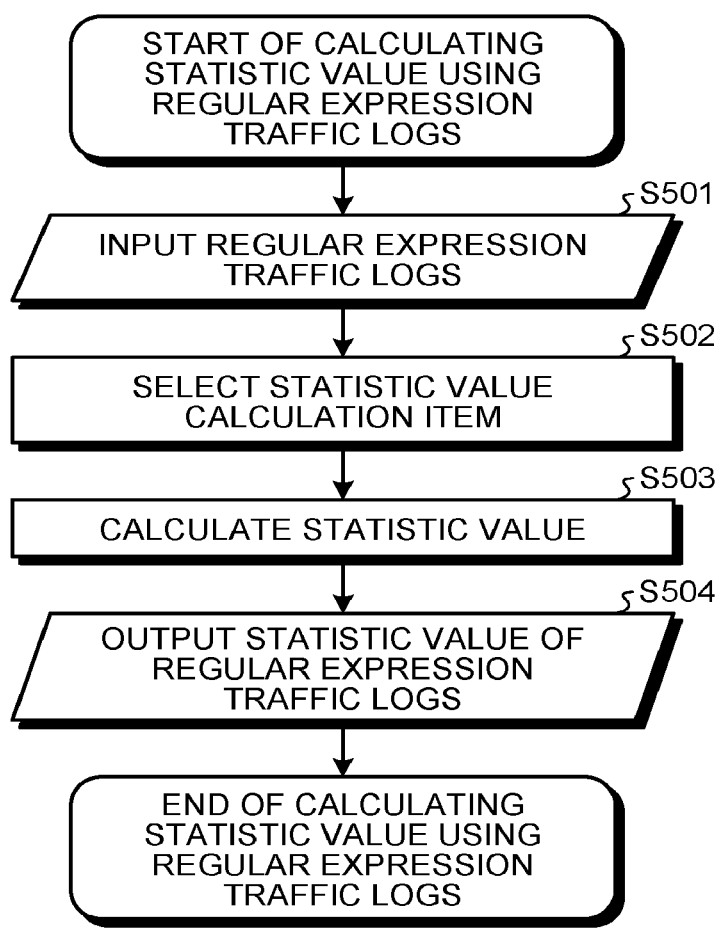
FIG. 16 is a flowchart illustrating a procedure of statistic value calculation processing by a refinement unit of the information collection/distribution server according to the first embodiment.

FIG. 16 is a flowchart illustrating a procedure of the statistic value calculation processing by the refinement unit 32d of the information collection/distribution server 30 according to the first embodiment. FIG. 10 illustrating the regular expression traffic logs on the network to be protected is input to the refinement unit 32d (step S501). Subsequently, the refinement unit 32d selects an item for which the statistic value is to be calculated from among these traffic logs (step S502). FIG. 16 assumes that the refinement unit 32d selects the number of the communication source IP addresses and the number of communication destination FQDNs.

Thereafter, the refinement unit 32d calculates the statistic value (step S503). FIG. 16 assumes that the refinement unit 32d calculates the degree of popularity in the communication source IP addresses, the degree of popularity in the communication destination FQDNs, and the degree of rarity using the number of the communication source IP addresses and the number of the communication destination FQDNs. Following this, the refinement unit 32d outputs the statistic value of the regular expression traffic logs (step S504). For example, the refinement unit 32d outputs respective statistic values illustrated in FIG. 17.

FIG. 17 is a diagram for explaining a processing action by the refinement unit 32d according to the first embodiment when calculating the statistic values within the traffic logs using the regular expression traffic logs. FIG. 17 illustrates an example where five statistic values, namely, the number of the communication source IP addresses, the number of the communication destination FQDNs, the degree of popularity in the communication source IP addresses, the degree of popularity in the communication destination FQDNs, and the degree of rarity are calculated when the respective items included in the regular expression traffic logs are summarized within these traffic logs. The statistic values are not limited to these items. The degree of popularity in the communication source IP addresses is defined as "(the degree of popularity in the communication source IP addresses)=(the number of the communication source IP addresses)/(a maximum value of the number of the communication source IP addresses)," whereas the degree of popularity in the communication destination FQDNs is defined as "(the degree of popularity in the communication destination FQDNs)=(the number of the communication destination FQDNs)/(a maximum value of the number of the communication destination FQDNs)."

Meanwhile, for example, the degree of rarity is defined as follows using the degree of popularity in the communication source IP addresses and the degree of popularity in the communication destination FQDNs. Specifically, the degree of rarity is expressed as "(the degree of rarity)=1−(a minimum value among the degree of popularity in the communication source IP addresses and the degree of popularity in the communication destination FQDNs)." For example, when calculating the statistic values exemplified herein in respect to the data of the serial number 1, the refinement unit 32d first calculates that the number of the communication source IP addresses that have carried out the communication of the data of the serial number 1 is 100 and similarly, the number of the communication destination FQDNs is 100. The refinement unit 32d then calculates that the maximum value of the number of the communication source IP addresses within this traffic is 1000 and similarly, the maximum value of the number of the communication destination FQDNs is 1000, thereby calculating the following statistic values. Namely, the refinement unit 32d calculates as follows: "(the degree of popularity in the communication source IP addresses of the serial number 1)=100/1000=0.1," "(the degree of popularity in the communication destination FQDNs of the serial number 1)=100/1000=0.1," and "(the degree of rarity of the serial number 1)=1−0.1=0.9."

Figure 18:
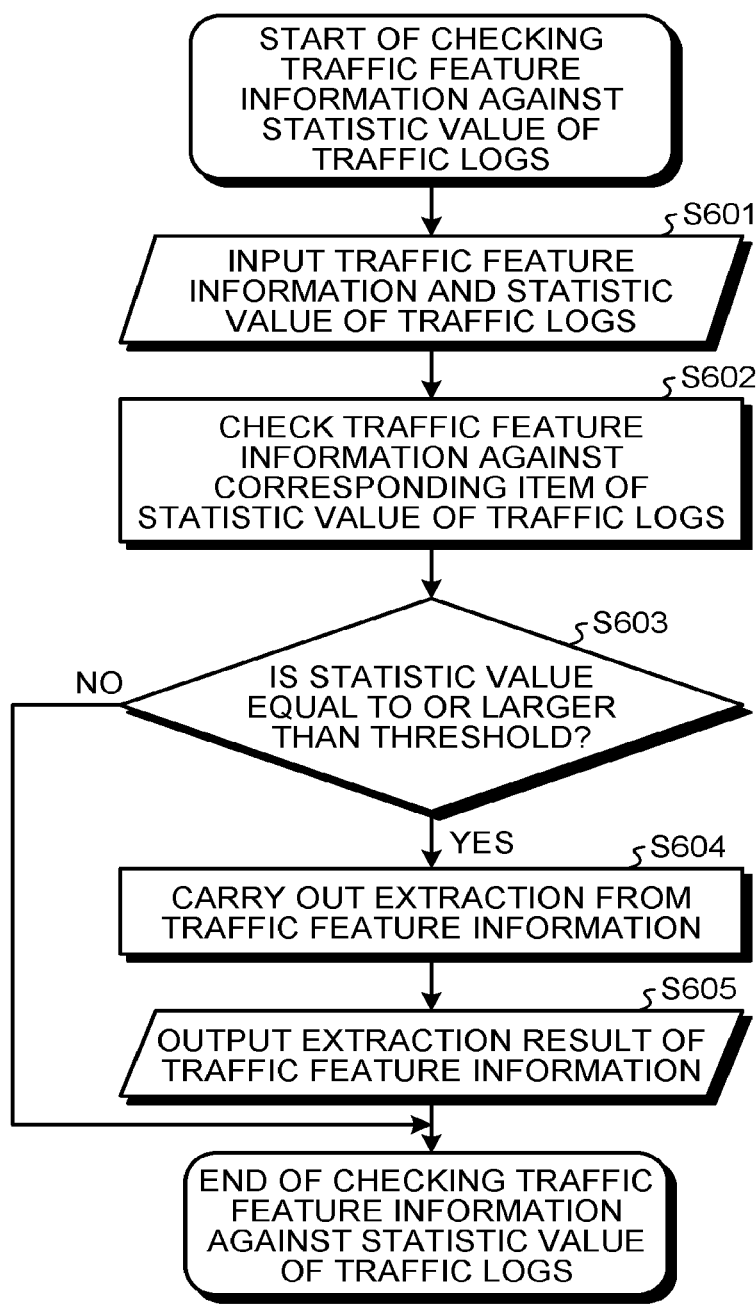
FIG. 18 is a flowchart illustrating a procedure of processing by the refinement unit of the information collection/distribution server according to the first embodiment when checking the traffic feature information against the statistic values of the traffic logs.

FIG. 18 is a flowchart illustrating a procedure of processing by the refinement unit 32d of the information collection/distribution server 30 according to the first embodiment when checking the traffic feature information against the statistic values of the traffic logs. As illustrated in FIG. 18, the traffic feature information and the statistic values of the traffic logs are input to the refinement unit 32d (step S601). For example, the traffic feature information illustrated in FIG. 15 and the statistic values of the traffic logs illustrated in FIG. 17 are input to the refinement unit 32d.

Subsequently, the refinement unit 32d checks the traffic feature information against the corresponding items of the statistic values of the traffic logs (step S602). For example, the refinement unit 32d gives, individually to the URL path portion, the URL query portion, and UserAgent included in the traffic feature information, the statistic values of the traffic logs for these items through checking against FIG. 17.

Thereafter, the refinement unit 32d determines whether the statistic value is no less than the threshold (step S603).

For example, the refinement unit 32d determines whether each of the statistic values for the URL path portion, the URL query portion, and UserAgent out of the traffic feature information is no less than the threshold set in advance. Here, when it is not determined that the statistic value is equal to or larger than the threshold (step S603: No), the refinement unit 32d terminates the processing.

On the other hand, when it is determined that the statistic value is equal to or larger than the threshold (step S603: Yes), the refinement unit 32d carries out the extraction therefor from the traffic feature information (step S604). Thereafter, the refinement unit 32d outputs an extraction result of the traffic feature information (step S605). For example, the refinement unit 32d extracts solely a case where each of the statistic values for the URL path portion, the URL query portion, and UserAgent out of the traffic feature information is equal to or larger than the threshold set in advance to output as FIG. 19.

FIG. 19 is a diagram illustrating an example of a result of the check processing by the refinement unit 32d according to the first embodiment. FIG. 19 illustrates an example where the traffic feature information illustrated in FIG. 15 which has been obtained as a result of the clustering has been checked against the statistic values of the traffic logs illustrated in FIG. 17 and then the traffic feature information having the statistic value equal to or larger than the threshold has been extracted. As illustrated in FIG. 19, the refinement unit 32d gives, to the traffic feature information of the cluster extracted from FIG. 15 and the traffic feature information extracted from the other clusters, the degree of rarity for the URL path portion, the degree of rarity for the URL query portion, and the degree of rarity for UserAgent out of the statistic values of the traffic logs illustrated in FIG. 17, thereby extracting an entry having 0.9 or larger for the thresholds for the respective degrees of rarity. In the example illustrated in FIG. 19, the extracted traffic feature information is expressed as a white-colored entry and the serial number 1 is designated as the extracted traffic feature information. The threshold serves as an example and can be changed arbitrarily.

Figure 20:
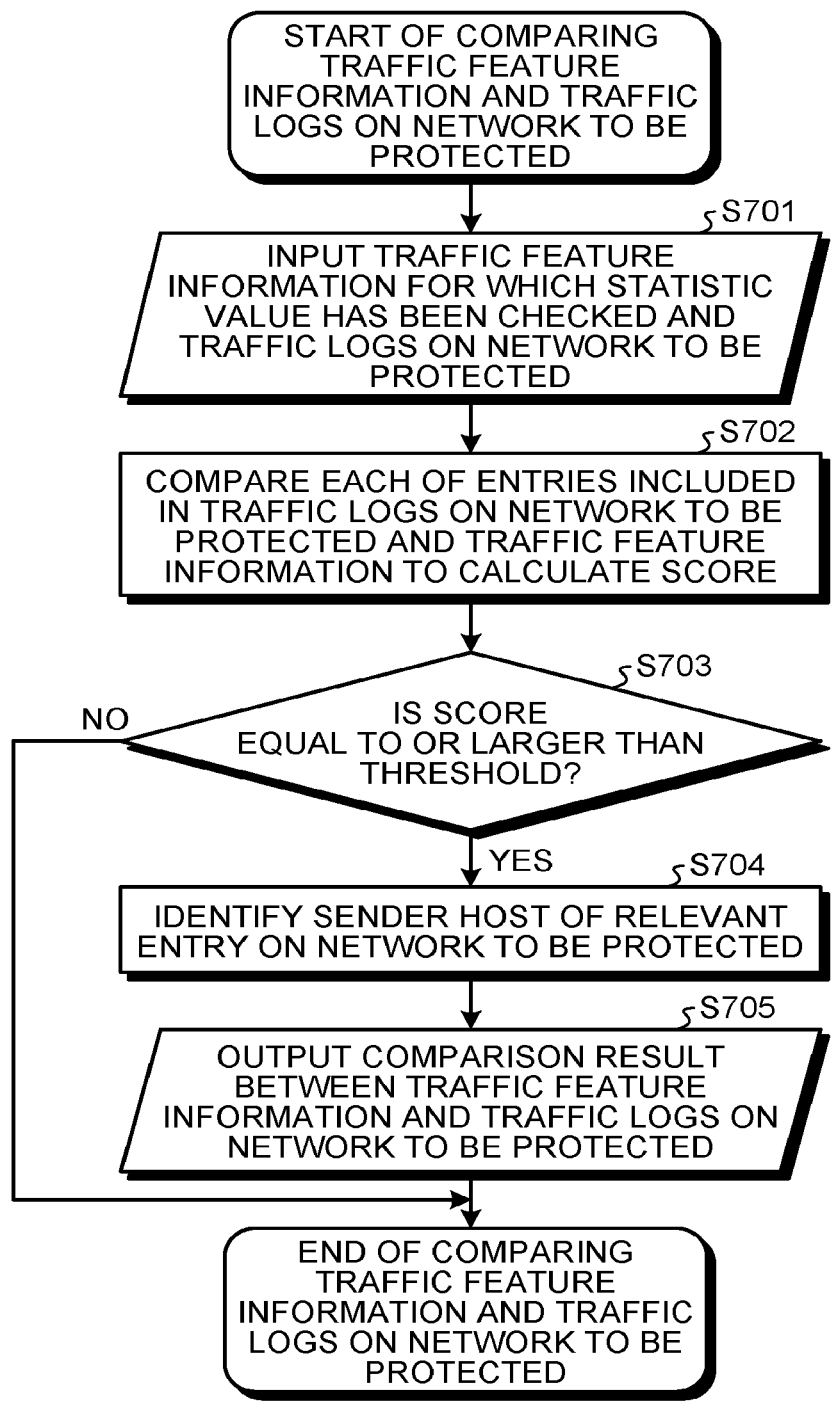
FIG. 20 is a flowchart illustrating a procedure of comparison processing by an identification unit of the information collection/distribution server according to the first embodiment.

FIG. 20 is a flowchart illustrating a procedure of comparison processing by the identification unit 32e of the information collection/distribution server 30 according to the first embodiment. As illustrated in FIG. 20, the traffic feature information for which the statistic value has been checked and the traffic log on the network to be protected are input to the identification unit 32e (step S701). For example, the traffic feature information illustrated in FIG. 19 for which the statistic values have been checked and the traffic logs illustrated in FIG. 3 on the network to be protected are input to the identification unit 32e.

Subsequently, the identification unit 32e compares each of the entries included in the traffic logs on the network to be protected and the traffic feature information for which the statistic value has been checked, to calculate a score (step S702). For example, the identification unit 32e compares each of the entries included in the traffic logs on the network to be protected with the URL path portion and the URL query portion included in the traffic feature information for which the statistic value has been checked, to calculate a score. Although the score can be arbitrarily defined, FIG. 20 defines the score in such a manner that the score becomes equal to or larger than the threshold solely in a case where the FQDNs, the URL path portions, and the URL query portions completely match between the URLs in the traffic feature information and the traffic log. In addition, as another example of a method for defining the score, it is considered to define the score as an average of the degree of similarity among the items commonly included in the traffic feature information. In FIG. 20, the respective items solely contain character strings and it is thus possible to use a prior technique for the calculation of the degree of similarity among the character strings.

The identification unit 32e determines whether the calculated score is no less than a threshold specified in advance (step S703). Here, when it is not determined that the calculated score is equal to or larger than the threshold specified in advance (step S703: No), the identification unit 32e terminates the processing. On the other hand, when it is determined that the calculated score is equal to or larger than the threshold specified in advance (step S703: Yes), the identification unit 32e identifies a sender host of the relevant entry on the network to be protected (step S704). At this point, in a case where the calculated score is equal to or larger than the threshold specified in advance, it is interpreted that the entry is similar to the traffic feature information. In particular, in a case illustrated in FIG. 20, the entry is similar to the traffic feature information generated from the traffic by malware. Therefore, by identifying the sender host thereof, a terminal infected with malware can be discovered.

Thereafter, the identification unit 32e outputs a comparison result between the traffic feature information and the traffic log on the network to be protected (step S705). For example, the identification unit 32e outputs a result illustrated in FIG. 21 as a result of the identification of the sender host.

FIG. 21 is a diagram illustrating an example of a comparison result according to the first embodiment. FIG. 21 illustrates an example where the traffic logs on the network to be protected, which are illustrated in FIG. 3, are compared with the traffic feature information illustrated in FIG. 19 for which the statistic values have been checked and, when the FQDNs, the URL path portions, and the URL query portions completely match between the URLs, the sender host is identified from the communication source IP address of that URL. In FIG. 21, the traffic log containing the identified sender host is expressed as a white-colored entry and the serial number 1 is designated as such a traffic log.

The word list table 34b is generated by calculating the statistic values for the items used in the protocol stack for communication in the traffic logs generated by malware and then extracting a certain character string included in the item having the calculated statistic value equal to or larger than the threshold.

For example, regarding the traffic logs generated by similar types of malware or a plurality of types of malware, the regular expression unit 32a calculates the statistic values for the respective items in the header information or the data information included in one protocol or a combination of a plurality of protocols used in the protocol stack for communication. Thereafter, the regular expression unit 32a extracts a certain character string included in the header information or the data information having the statistic value for a specific item equal to or larger than the threshold.

Figure 22:
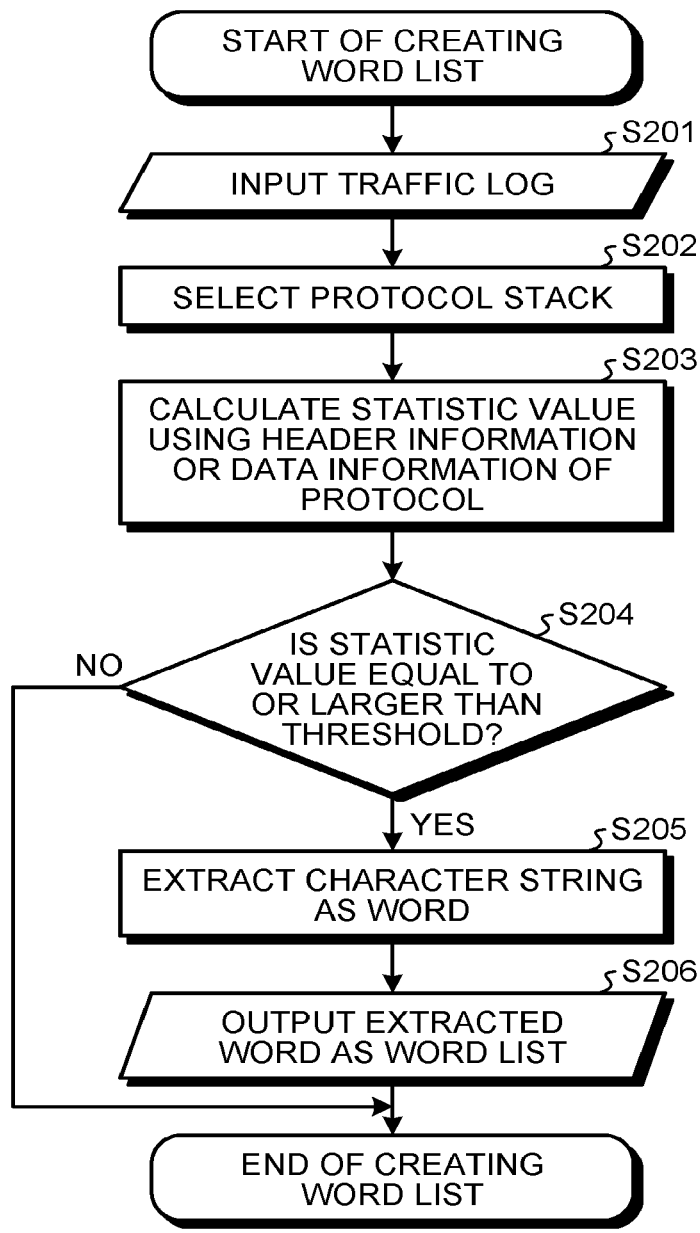
FIG. 22 is a flowchart illustrating a procedure of word list generation processing by the regular expression unit of the information collection/distribution server according to the first embodiment.

FIG. 22 is a flowchart illustrating a procedure of word list generation processing by the regular expression unit 32a of the information collection/distribution server 30 according to the first embodiment. FIG. 22 illustrates an example where a word list is created from the traffic logs illustrated in FIG. 2. The traffic logs generated by malware, which are illustrated in FIG. 2, are input to the regular expression unit 32a (step S201).

Subsequently, the regular expression unit 32a selects the protocol stack (step S202). A case where the HTTP is selected as the protocol stack will be described hereinafter. Thereafter, the regular expression unit 32a calculates the statistic value (frequency of appearance) for the URL included in the header information of the HTTP (step S203).

The regular expression unit 32a determines whether this statistic value is no less than the threshold set in advance (step S204). Here, when it is not determined that the statistic value is equal to or larger than the threshold set in advance (step S204: No), the regular expression unit 32a terminates the processing. On the other hand, when it is determined that the statistic value is equal to or larger than the threshold set in advance (step S204: Yes), the regular expression unit 32a extracts a character string as a word (step S205) and outputs the extracted word as the word list (step S206). For example, the regular expression unit 32a extracts the serial number 1, the serial number 3, and the serial number 233 in FIG. 2 as words. It is assumed that the protocol stack to be selected, the selection of the information, and this statistic value and this threshold can be arbitrarily selected. A character string constituted by two characters or more included in the path portion and the query portion of the URL determined as being equal to or larger than the threshold is selected to be extracted as a word. With this, the regular expression unit 32a generates the word list table 34b illustrated in FIG. 5, for example.

As described above, the first embodiment clusters the entries of the traffic logs represented in the regular expression and extracts, as the traffic feature information of each of the clusters, the entry having a minimum total sum of distances among the entries included in the clustered traffic logs. As a result, according to the first embodiment, accurate feature information of attacks can be extracted at low cost.

Additionally in the first embodiment, both of the traffic feature information created from the traffic logs generated by malware and the statistic values of the traffic logs on the network to be protected are used to extract the traffic feature information. Consequently, it is made possible to efficiently extract traffic similar to the traffic feature information within the traffic logs on the network to be protected and at the same time, rare on the network to be protected. According to the first embodiment, by identifying the sender host of such traffic, a terminal infected with malware can be also discovered efficiently.

In the first embodiment, the information collection/distribution server 30 has been described as being connected to the network 1 and provided so as to stand alone. However, embodiments are not limited thereto.

For example, functions included in the information collection/distribution server 30 as the traffic feature information extraction/comparison unit 32 (the regular expression unit 32a, the clustering unit 32b, the feature information extraction unit 32c, the refinement unit 32d, and the identification unit 32e) may be provided within the network 2 or the network 3. In this case, the information collection/distribution server 30 carries out an approach for extracting and comparing the traffic feature information while an operator collects the traffic logs individually from each of equipment and software.

Meanwhile, the aforementioned embodiment has described that the information collection/distribution server 30 collects the traffic logs to extract the traffic feature information and then compares the extracted traffic feature information with a certain traffic log to be protected. However, embodiments are not limited thereto. For example, the information collection/distribution server 30 may not carry out processing for comparing the extracted traffic feature information with the traffic log. Specifically, the information collection/distribution server 30 may not carry out processing in step S4 and step S5 illustrated in FIG. 7. In this case, the information collection/distribution server 30 collects the traffic logs and extracts the traffic feature information. In addition, in a case where the extraction of the feature information is only required, the information collection/distribution server 30 may be configured without the feature information collection/distribution unit 33.

[b] Second Embodiment

The embodiment of the invention has been described thus far. However, in addition to the aforementioned embodiment, the invention may be carried out in other embodiments. Accordingly, other embodiments will be described hereinafter.

System Configuration

Among the variety of processing described in the embodiment, all or some of the processing described as being automatically carried out can be carried out manually, or reversely, all or some of the processing described as being manually carried out can be carried out automatically using a publicly available method. In addition to this, information indicated within this document and the drawings described above including processing procedures, control procedures, specific names, and various types of data and parameters (e.g., FIG. 1 to FIG. 22) can be arbitrarily altered unless otherwise specially stated.

Each of the illustrated components of the respective devices serves as a sort of a function concept and thus is not necessarily required to be physically configured as illustrated. In other words, specific modes of separation and integration of the respective devices are not limited to the illustrated ones and accordingly, all or some thereof can be configured so as to be functionally and physically separated or integrated in any units depending on various types of loads, usage, and the like.

Program

A traffic feature information extraction program can be also generated in which processing carried out by the information collection/distribution server 30 according to the aforementioned first embodiment is described in a language executable by a computer. In this case, a similar effect to that of the aforementioned embodiment can be obtained when the computer executes the traffic feature information extraction program. Furthermore, an online sign-up control program therefor may be recorded to a computer-readable recording medium such that the computer is caused to read the traffic feature information extraction program recorded in this recording medium to execute, thereby realizing similar processing to that of the aforementioned embodiment. Hereinafter, an example of the computer that executes the traffic feature information extraction program configured to realize a similar function to that of the information collection/distribution server 30 illustrated in FIG. 1, etc. will be described.

Figure 23:
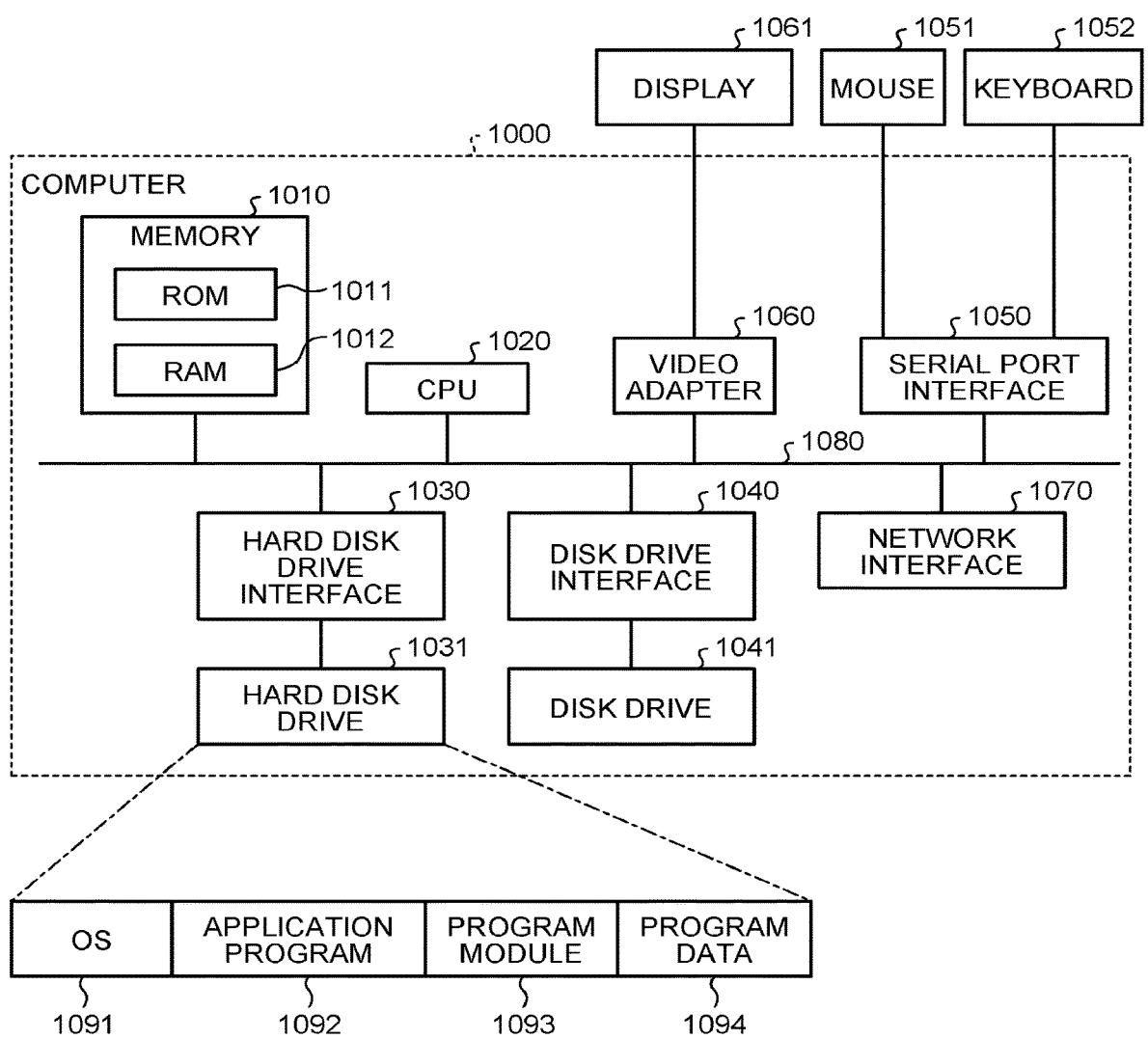
FIG. 23 is a diagram illustrating a computer that executes a traffic feature information extraction program.

FIG. 23 is a diagram illustrating a computer 1000 that executes the traffic feature information extraction program. As illustrated in FIG. 23, the computer 1000 includes, for example, a memory 1010, a CPU 1020, a hard disk drive interface 1030, a disk drive interface 1040, a serial port interface 1050, a video adapter 1060, and a network interface 1070. These respective components are connected through a bus 1080.

The memory 1010 includes a read only memory (ROM) 1011 and a RAM 1012. The ROM 1011 stores a boot program such as a basic input output system (BIOS). The hard disk drive interface 1030 is connected to a hard disk drive 1031. The disk drive interface 1040 is connected to a disk drive 1041. A detachable storage medium such as a magnetic disk or an optical disc is inserted into the disk drive 1041. A mouse 1051 and a keyboard 1052 are connected to the serial port interface 1050, for example. A display 1061 is connected to the video adapter 1060, for example.

Here, as illustrated in FIG. 23, the hard disk drive 1031 stores, for example, an OS 1091, an application program 1092, a program module 1093, and program data 1094. The traffic feature information extraction program described above in the embodiment is stored in, for example, the hard disk drive 1031 or the memory 1010.

For example, the traffic feature information extraction program is also stored in the hard disk drive 1031 or the like as a program module in which an instruction executed by the computer 1000 is described. Specifically, the hard disk drive 1031 stores the program module 1093 in which a regular expression procedure that carries out information processing similar to that of the regular expression unit 32a described in the aforementioned embodiment, a clustering procedure that carries out information processing similar to that of the clustering unit 32b, and a feature information extraction procedure that carries out information processing similar to that of the feature information extraction unit 32c are described.

Data used in information processing by the traffic feature information extraction program is stored in, for example, the hard disk drive 1031 as the program data 1094. The CPU 1020 reads the program module 1093 stored in the hard disk drive 1031 and the program data 1094 to the RAM 1012 as necessary to carry out the respective procedures described above.

The program module 1093 and the program data 1094 according to the traffic feature information extraction program are not limited to a case where the program module 1093 and the program data 1094 are stored in the hard disk drive 1031 and, for example, may be stored in a detachable storage medium so as to be read by the CPU 1020 using the disk drive 1041. Alternatively, the program module 1093 and the program data 1094 according to the traffic feature information extraction program may be stored in another computer connected through a network such as a LAN or a wide area network (WAN) so as to be read by the CPU 1020 using the network interface 1070.

Others

The traffic feature information extraction program described in the embodiment can be distributed through a network such as the Internet. In addition, a specific program can be recorded to a computer-readable recording medium such as a hard disk, a flexible disk (FD), a CD-ROM, an MO, and a DVD so as to be read from the recording medium by the computer when executed.

REFERENCE SIGNS LIST 1 to 5 NETWORK
6 to 13 PACKET FORWARDING UNIT
14 DECOY SERVER
15 DECOY TERMINAL
16 TERMINAL-TYPE SANDBOX
17 SERVER-TYPE SANDBOX
18, 19 USER SERVER
20, 21 USER TERMINAL
22 to 24 COMMUNICATION MONITOR
25 TERMINAL ATTACK DETECTION SOFTWARE
26 SERVER ATTACK DETECTION SOFTWARE
27 ATTACKER TERMINAL
28 MALWARE DISTRIBUTION SERVER
29 MALICIOUS SERVER
30 INFORMATION COLLECTION/DISTRIBUTION SERVER
31 LOG COLLECTION UNIT
32 TRAFFIC FEATURE INFORMATION EXTRACTION/COMPARISON UNIT
  32a REGULAR EXPRESSION UNIT
  32b CLUSTERING UNIT
  32c FEATURE INFORMATION EXTRACTION UNIT
  32d REFINEMENT UNIT
  32e IDENTIFICATION UNIT
33 FEATURE INFORMATION COLLECTION/DISTRIBUTION UNIT
34 STORAGE UNIT
  34a REGULAR EXPRESSION PATTERN TABLE
  34b WORD LIST TABLE
  34c DESTINATION INFORMATION TABLE
1000 COMPUTER
1010 MEMORY
1011 ROM
1012 RAM
1020 CPU
1030 HARD DISK DRIVE INTERFACE
1031 HARD DISK DRIVE
1040 DISK DRIVE INTERFACE
1041 DISK DRIVE
1050 SERIAL PORT INTERFACE
1051 MOUSE
1052 KEYBOARD
1060 VIDEO ADAPTER
1061 DISPLAY
1070 NETWORK INTERFACE
1080 BUS
1091 OS
1092 APPLICATION PROGRAM
1093 PROGRAM MODULE
1094 PROGRAM DATA

What is claimed is:

1. A traffic feature information extraction method to be executed in a traffic feature information extraction device, the traffic feature information extraction method comprising:
  a regular expression step of extracting an item from a traffic log that includes a plurality of entries corresponding to traffic known to have been generated by malware, the item representing a partial character string in a regular expression based on a predetermined rule, and the partial character string having been included in the item, wherein the representation of the item in the regular expression includes combining a predetermined regular expression pattern based on a character type of the item and a number of characters included in the item;
  a clustering step of clustering, after the regular expression step, plural entries of the traffic log represented in the regular expression into at least one cluster;
  a calculating step of calculating for each respective entry of the entries within a single cluster of the at least one cluster, a distance between the respective entry and entries other than the respective entry within the single cluster to determine a total sum of distances for the respective entry; and a feature information extraction step of extracting, as traffic feature information of the cluster, a particular entry, among the entries of the single cluster, having a minimum total sum of distances among the entries included in the single cluster, wherein the regular expression step includes determining whether a word set forth in a word list is present in the partial character string included in the extracted item, the method further comprising:

a refinement step of calculating a statistic value within the traffic log using entries of the traffic log represented in the regular expression in accordance with an indicator and refining the traffic feature information based on the traffic feature information extracted from the clustered one or more entries of the traffic log and the statistic value, wherein the statistic value corresponds to a rarity of a specific portion of a Uniform Resource Locator (URL) of each of the plurality of entries in the traffic log, and determining whether the rarity of the specific portion of the traffic feature information is equal to or larger than a threshold value, and an identification step of comparing the specific portion of the traffic feature information refined in the refinement step and a corresponding specific portion of a URL of each entry of a certain traffic log on a network to be protected, when the rarity of the specific portion of the traffic feature information is equal to or larger than a threshold value, to calculate a score using an indicator and identifying an entry having the score equal to or larger than a threshold within the traffic log as corresponding to a terminal infected with malware.

2. The traffic feature information extraction method according to claim 1, wherein when the word is present in the partial character string, the partial character string is not represented in the regular expression, and when the word is not present in the partial character string, the partial character string is represented in the regular expression based on the predetermined rule.

3. The traffic feature information extraction method according to claim 2, wherein the word list is generated by calculating a statistic value for items used in a protocol stack for communication in the traffic log generated by malware and then extracting a certain character string included in the item having the calculated statistic value equal to or larger than a threshold.

4. The traffic feature information extraction method according to claim 1, wherein the clustering step includes using at least one of an approach that uses destination information indicating a destination of communication to cluster the one or more entries of the traffic log and an approach that uses a protocol for communication to cluster the one or more entries of the traffic log.

5. A traffic feature information extraction device, comprising:

processing circuitry configured to extract an item from a traffic log that includes a plurality of entries corresponding to traffic known to have been generated by malware, the item representing a partial character string in a regular expression based on a predetermined rule, and the partial character string having been included in the item, wherein the representation of the item in the regular expression includes combining a predetermined regular expression pattern based on a character type of the item and a number of characters included in the item;

cluster plural entries of the traffic log represented in the regular expression into at least one cluster;

calculate for each respective entry of the entries within a single cluster of the at least one cluster, a distance between the respective entry and entries other than the respective entry within the single at least one cluster to determine a total sum of distances for the respective entry; and extract, as traffic feature information of the cluster, a particular entry, among the entries of the single cluster, having a minimum total sum of distances among the entries included in the single cluster, wherein the processing circuitry determines whether a word set forth in a word list is present in the partial character string included in the extracted item, clusters the entries determining whether the word set forth in the word list is present, calculates, in a refinement step, a statistic value within the traffic log using entries of the traffic log represented in the regular expression in accordance with an indicator and refines the traffic feature information based on the traffic feature information extracted from the clustered one or more entries of the traffic log and the statistic value, wherein the statistic value corresponds to a rarity of a specific portion of a Uniform Resource Locator (URL) of each of the plurality of entries in the traffic log, and determining whether the rarity of the specific portion of the traffic feature information is equal to or larger than a threshold value, and compares the specific portion of the traffic feature information refined in the refinement step and a corresponding specific portion of a URL of each entry of a certain traffic log on a network to be protected, when the rarity of the specific portion of the traffic feature information is equal to or larger than a threshold value, to calculate a score using an indicator and identifying an entry having the score equal to or larger than a threshold within the traffic log as corresponding to a terminal infected with malware.

6. A non-transitory computer-readable recording medium having stored therein a traffic feature information extraction program that causes a computer to execute a process comprising:

a regular expression procedure of extracting an item from a traffic log that includes a plurality of entries corresponding to traffic known to have been generated by malware, the item representing a partial character string in a regular expression based on a predetermined rule, and the partial character string having been included in the item, wherein the representation of the item in the regular expression includes combining a predetermined regular expression pattern based on a character type of the item and a number of characters included in the item;

a clustering procedure of clustering, after the regular expression procedure, plural entries of the traffic log represented in the regular expression into at least one cluster;

a calculating procedure of calculating for each respective entry of the entries within a single cluster of the at least one cluster, a distance between the respective entry and entries other than the respective entry within the single cluster to determine a total sum of distances for the respective entry; and a feature information extraction procedure of extracting, as traffic feature information of the cluster, a particular, among the entries of the single cluster, having a minimum total sum of distances among the entries included in the the single cluster, wherein the regular expression procedure includes determining whether a word set forth in a word list is present in the partial character string included in the extracted item, the process further including:

a refinement procedure of calculating a statistic value within the traffic log using entries of the traffic log represented in the regular expression in accordance with an indicator and refining the traffic feature information based on the traffic feature information extracted from the clustered one or more entries of the traffic log and the statistic value, wherein the statistic value corresponds to a rarity of a specific portion of a Uniform Resource Locator (URL) of each of the plurality of entries in the traffic log, and determining whether the rarity of the specific portion of the traffic feature information is equal to or larger than a threshold value, and an identification procedure of comparing the specific portion of the traffic feature information refined in the refinement procedure and a corresponding specific portion of a URL of each entry of a certain traffic log on a network to be protected, when the rarity of the specific portion of the traffic feature information is equal to or larger than a threshold value, to calculate a score using an indicator and identifying an entry having the score equal to or larger than a threshold within the traffic log as corresponding to a terminal infected with malware.

* * * * *